(12) United States Patent
Naraghi et al.

(10) Patent No.: US 12,373,169 B1
(45) Date of Patent: Jul. 29, 2025

(54) TIME-BASED MULTIPLY-AND-ACCUMULATE COMPUTATION

(71) Applicant: ANAFLASH Inc., Sunnyvale, CA (US)

(72) Inventors: Shahrzad Naraghi, San Jose, CA (US); Ankush Goel, San Jose, CA (US)

(73) Assignee: ANAFLASH Inc., Sunnyvale, CA (US)

( * ) Notice: Subject to any disclaimer, the term of this patent is extended or adjusted under 35 U.S.C. 154(b) by 915 days.

(21) Appl. No.: 17/536,002

(22) Filed: Nov. 27, 2021

Related U.S. Application Data

(60) Provisional application No. 63/118,931, filed on Nov. 29, 2020.

(51) Int. Cl.
G06F 7/544 (2006.01)
G06F 17/16 (2006.01)
G06G 7/16 (2006.01)

(52) U.S. Cl.
CPC ............ G06F 7/5443 (2013.01); G06F 17/16 (2013.01); G06G 7/16 (2013.01)

(58) Field of Classification Search
CPC .. G06F 7/5443; G06F 17/16; G06G 7/16–161
See application file for complete search history.

(56) References Cited

U.S. PATENT DOCUMENTS

| | | | |
|---|---|---|---|
| 5,241,492 A | 8/1993 | Girardeau, Jr. | |
| 5,644,519 A | 7/1997 | Yatim et al. | |
| 5,928,316 A | 7/1999 | Wong et al. | |
| 7,711,765 B2 | 5/2010 | Wang et al. | |
| 8,838,664 B2 | 9/2014 | Oliver et al. | |
| 9,753,695 B2 | 9/2017 | Mortensen et al. | |
| 10,089,078 B2 | 10/2018 | Vincenzoni et al. | |
| 10,409,592 B2 | 9/2019 | Burgess et al. | |
| 10,409,604 B2 | 9/2019 | Kennedy et al. | |
| 10,572,225 B1 | 2/2020 | Ghasemi et al. | |
| 10,747,502 B2 | 8/2020 | Pareek et al. | |
| 10,789,401 B1 | 9/2020 | Tiwary et al. | |
| 10,879,877 B1 | 12/2020 | Yadav | |
| 10,879,923 B1 | 12/2020 | Chakraborty et al. | |

(Continued)

FOREIGN PATENT DOCUMENTS

EP 1058185 A1 12/2000

*Primary Examiner* — Matthew D Sandifer
(74) *Attorney, Agent, or Firm* — Jacobsen IP Law; Krista S. Jacobsen

(57) ABSTRACT

Disclosed are devices, systems, and methods for performing time-domain multiply-and-accumulate (MAC) computations. In some embodiments, an apparatus comprises first and second circuits. The first circuit is configured to (a) perform a first multiplication in response to a trigger signal, the first multiplication being a product of a first value and a second value, and (b) generate a completion signal, wherein the completion signal indicates completion of the first multiplication. The second circuit is coupled to the first circuit and is configured to (i) perform a second multiplication in response to the completion signal, the second multiplication being a product of a third value and a fourth value, and (ii) generate an output signal, wherein the output signal indicates completion of the second multiplication. An amount of elapsed time between the trigger signal and the generation of the output signal represents a sum of the first and second multiplications.

20 Claims, 18 Drawing Sheets

(56) References Cited

U.S. PATENT DOCUMENTS

| | | | |
|---|---|---|---|
| 10,972,103 | B2 | 4/2021 | Wang |
| 11,132,176 | B2 | 9/2021 | Hung et al. |
| 2013/0339677 | A1 | 12/2013 | Tullberg |
| 2014/0095572 | A1 | 4/2014 | Bahary et al. |
| 2018/0088908 | A1 | 3/2018 | Vincenzoni et al. |
| 2020/0192971 | A1 | 6/2020 | Lue et al. |
| 2020/0334015 | A1 | 10/2020 | Shibata et al. |
| 2021/0004208 | A1 | 1/2021 | Lai et al. |
| 2021/0064367 | A1* | 3/2021 | Kim ............... G04F 10/005 |
| 2021/0111722 | A1 | 4/2021 | Kalsi et al. |
| 2021/0192324 | A1 | 6/2021 | Srivastava |
| 2021/0279055 | A1 | 9/2021 | Saxena et al. |
| 2021/0326112 | A1 | 10/2021 | Chakraborty et al. |
| 2021/0349691 | A1 | 11/2021 | Hekmatshoartabari et al. |
| 2021/0405967 | A1* | 12/2021 | Jung ............... G06N 3/065 |
| 2022/0027130 | A1* | 1/2022 | Kashmiri ............ G06N 3/048 |
| 2022/0091822 | A1* | 3/2022 | Rachala ............ H03K 21/08 |

\* cited by examiner

TIME-BASED MULTIPLY-AND-ACCUMULATE COMPUTATION

CROSS-REFERENCE TO RELATED APPLICATIONS

This application claims the benefit of, and hereby incorporates by reference in its entirety for all purposes, U.S. Provisional Application No. 63/118,931, filed Nov. 29, 2020 and entitled "Time-based multiply and accumulate computation."

BACKGROUND

Vector matrix multiplication can be used in myriad applications, such as, for example, signal processing, smart sensors, hardware accelerators for machine learning (ML), artificial intelligence (AI), vision chips, the Internet of things (IoT), and the fusion of the IoT and AI, which is known as AIoT. Vector matrix multiplication can use multiply-and-accumulate (MAC) computations in which pairs of numbers are multiplied together (the "multiply" part of the operation) and the results of all the multiplications (also referred to herein as dot products) are added together (the "accumulate" part of the operation).

Traditionally, MAC operations have been performed in digital processing elements based on Von Neumann computing. One input (e.g., a weight in a deep learning algorithm) is read from an array (e.g., memory) and multiplied by the other input (e.g., an element of an input activation vector), and the product is added to the previous multiplications. For large vectors and array sizes, this technique of computation requires many data movements between memory and a processor, which leads to a poor energy performance (e.g., high power consumption).

In recent years, there has been an attempt to create computing architectures that reduce data movement in large arrays and increase efficiency. In one such approach, the computation is embedded in analog format inside an array where the weights are stored. This approach can also help to parallelize MACs and increase the speed of operation. The analog MAC operations are based on the concept of adding up the currents or charges entering a common point inside the array. The common point in these techniques is generally a long column or row in the array (e.g., a column of pixels in sensors or a bit line in memory). This common point has a large capacitance and/or resistance value, which limits the potential energy savings, linearity, and accuracy of these methods. In addition, because the MAC operation is performed in the analog domain, the result must be digitized by an analog-to-digital converter (ADC) in order to be used by a downstream digital system. An implementation of the ADC (e.g., in an integrated circuit) can consume significant area and energy for the required accuracy. Furthermore, the ADC adds a delay at the end of the operation.

Therefore, there is a need for techniques that overcome the above-mentioned disadvantages.

SUMMARY

This summary represents non-limiting embodiments of the disclosure.

Disclosed herein are new devices, systems, and methods to implement MAC computations (also referred to herein as MAC operations) in the time-domain. Because the accumulation happens in time, a simple time-to-digital converter (TDC) (e.g., a counter) can digitize the output simultaneously with the accumulation (as it occurs), thereby eliminating any need for a separate ADC, which reduces both computation time (because the TDC can operate in parallel with the accumulation) and complexity (because a TDC is simpler to implement than an ADC is).

The disclosed systems, devices, and methods can be embedded into large arrays, thereby reducing power consumption with no signal-to-noise ratio (SNR) penalty. The disclosed approaches can also decouple MAC computations from ordinary read/write functions in arrays. For example, the MAC computation does not disturb the ordinary read and write memory functions in a storage (e.g., memory) array irrespective of the array size. In addition, the time-domain quantization makes the disclosed architecture very flexible. Different precisions and accuracies can be achieved by changing the clock period in the TDC or by increasing the accumulation time without any hardware change.

In some aspects, the techniques described herein relate to an apparatus for performing time-domain MAC computations, the apparatus including: a first circuit configured to (a) perform a first multiplication in response to a trigger signal, the first multiplication being a product of a first value and a second value, and (b) generate a completion signal, wherein the completion signal indicates completion of the first multiplication; and a second circuit coupled to the first circuit and configured to (i) perform a second multiplication in response to the completion signal, the second multiplication being a product of a third value and a fourth value, and (ii) generate an output signal, wherein the output signal indicates completion of the second multiplication, wherein an amount of elapsed time between the trigger signal and the generation of the output signal represents a sum of the first multiplication and the second multiplication.

In some aspects, the techniques described herein relate to an apparatus, wherein at least two of the first value, the second value, the third value, and the fourth value are a same value. In some aspects, the techniques described herein relate to an apparatus, wherein all of the first value, the second value, the third value, and the fourth value are different values. In some aspects, the techniques described herein relate to an apparatus, wherein at least two of the first value, the second value, the third value, and the fourth value are equal. In some aspects, the techniques described herein relate to an apparatus, wherein at least two of the first value, the second value, the third value, and the fourth value are unequal. In some aspects, the techniques described herein relate to an apparatus, wherein at least one of the first value, second value, third value, or fourth value is a binary value. In some aspects, the techniques described herein relate to an apparatus, wherein at least one of the first value, second value, third value, or fourth value is a single-bit value. In some aspects, the techniques described herein relate to an apparatus, wherein at least one of the first value, second value, third value, or fourth value is a digital value. In some aspects, the techniques described herein relate to an apparatus, wherein at least one of the first value, second value, third value, or fourth value is an analog value.

In some aspects, the techniques described herein relate to an apparatus, wherein, in response to the first value being nonzero and the second value being nonzero, an amount of elapsed time between the trigger signal and the generation of the completion signal is proportional to the first multiplication.

In some aspects, the techniques described herein relate to an apparatus, wherein, in response to at least one of the first value or the second value being zero, an amount of elapsed time between the trigger signal and the generation of the completion signal is a constant amount of time.

In some aspects, the techniques described herein relate to an apparatus, wherein: the first circuit is configured to generate a first pulse having a duration proportional to an amount of time between the trigger signal and the completion signal, and the second circuit is configured to generate a second pulse having a duration proportional to an amount of time between the completion signal and the output signal.

In some aspects, the techniques described herein relate to an apparatus, wherein the trigger signal is a first signal edge and the completion signal is a second signal edge. In some aspects, the techniques described herein relate to an apparatus, wherein the output signal is a third signal edge.

In some aspects, the techniques described herein relate to an apparatus, wherein: the first value is an input to the first circuit, the second value is stored by a component of the first circuit, the third value is an input to the second circuit, and the fourth value is stored by a component of the second circuit.

In some aspects, the techniques described herein relate to an apparatus, wherein: the component of the first circuit is a first capacitor, and the component of the second circuit is a second capacitor. In some aspects, the techniques described herein relate to an apparatus, wherein: the component of the first circuit is a first memory cell, and the component of the second circuit is a second memory cell. In some aspects, the techniques described herein relate to an apparatus, wherein: the component of the first circuit is a capacitor, and the component of the second circuit is a memory cell.

In some aspects, the techniques described herein relate to an apparatus, wherein: the component of the first circuit is a memory cell, and the component of the second circuit is a capacitor.

In some aspects, the techniques described herein relate to an apparatus, wherein the second value and the fourth value are digital values. In some aspects, the techniques described herein relate to an apparatus, wherein the second value and the fourth value are binary values. In some aspects, the techniques described herein relate to an apparatus, wherein the second value and the fourth value are analog values. In some aspects, the techniques described herein relate to an apparatus, wherein the first value and the third value are digital values. In some aspects, the techniques described herein relate to an apparatus, wherein the first value and the third value are binary values. In some aspects, the techniques described herein relate to an apparatus, wherein the first value and the third value are analog values. In some aspects, the techniques described herein relate to an apparatus, wherein: the first value and the third value are binary values, and the second value and the fourth value are analog values. In some aspects, the techniques described herein relate to an apparatus, wherein: the first value and the third value are analog values, and the second value and the fourth value are binary values. In some aspects, the techniques described herein relate to an apparatus, wherein: the first value and the third value are digital values, and the second value and the fourth value are analog values. In some aspects, the techniques described herein relate to an apparatus, wherein: the first value and the third value are analog values, and the second value and the fourth value are digital values. In some aspects, the techniques described herein relate to an apparatus, wherein: the first value and the third value are digital values, and the second value and the fourth value are binary values. In some aspects, the techniques described herein relate to an apparatus, wherein: the first value and the third value are binary values, and the second value and the fourth value are digital values. In some aspects, the techniques described herein relate to an apparatus, wherein the first value, the second value, the third value, and the fourth value are binary values. In some aspects, the techniques described herein relate to an apparatus, wherein the first value, the second value, the third value, and the fourth value are digital values. In some aspects, the techniques described herein relate to an apparatus, wherein the first value, the second value, the third value, and the fourth value are analog values.

In some aspects, the techniques described herein relate to an apparatus, wherein: the first value and the second value are inputs to the first circuit, and the third value and the fourth value are inputs to the second circuit. In some aspects, the techniques described herein relate to an apparatus, wherein: the first value and the third value are binary values, and the second value and the fourth value are analog values. In some aspects, the techniques described herein relate to an apparatus, wherein: the first value and the third value are digital values, and the second value and the fourth value are analog values. In some aspects, the techniques described herein relate to an apparatus, wherein the first value, the second value, the third value, and the fourth value are binary values. In some aspects, the techniques described herein relate to an apparatus, wherein the first value, the second value, the third value, and the fourth value are digital values. In some aspects, the techniques described herein relate to an apparatus, wherein the first value, the second value, the third value, and the fourth value are analog values. In some aspects, the techniques described herein relate to an apparatus, wherein at least two of the first value, the second value, the third value, and the fourth value are binary values. In some aspects, the techniques described herein relate to an apparatus, wherein at least two of the first value, the second value, the third value, and the fourth value are digital values. In some aspects, the techniques described herein relate to an apparatus, wherein at least two of the first value, the second value, the third value, and the fourth value are analog values.

In some aspects, the techniques described herein relate to an apparatus, wherein: the first value is stored by a first component of the first circuit, the second value is stored by a second component of the first circuit, the third value is stored by a first component of the second circuit, and the fourth value is stored by a second component of the second circuit.

In some aspects, the techniques described herein relate to an apparatus, wherein at least one of the first component of the first circuit, the second component of the first circuit, the first component of the second circuit, or the second component of the second circuit is a capacitor.

In some aspects, the techniques described herein relate to an apparatus, wherein at least one of the first component of the first circuit, the second component of the first circuit, the first component of the second circuit, or the second component of the second circuit is a memory cell. In some aspects, the techniques described herein relate to an apparatus, wherein: the first value and the third value are binary values, and the second value and the fourth value are analog values. In some aspects, the techniques described herein relate to an apparatus, wherein: the first value and the third value are digital values, and the second value and the fourth value are analog values. In some aspects, the techniques described herein relate to an apparatus, wherein the first value, the second value, the third value, and the fourth value are binary values. In some aspects, the techniques described herein relate to an apparatus, wherein the first value, the second value, the third value, and the fourth value are digital values. In some aspects, the techniques described herein relate to an apparatus, wherein the first value, the second value, the third value, and the fourth value are analog values. In some aspects, the techniques described herein relate to an apparatus, wherein at least two of the first value, the second value, the third value, and the fourth value are binary values. In some aspects, the techniques described herein relate to an apparatus, wherein at least two of the first value, the second value, the third value, and the fourth value are digital values. In some aspects, the techniques described herein relate to an apparatus, wherein at least two of the first value, the second value, the third value, and the fourth value are analog values.

In some aspects, the techniques described herein relate to an apparatus, wherein the second circuit is further configured to provide the output signal via an output line, and further including a time-to-digital converter (TDC) coupled to the output line and configured to digitize the amount of elapsed time between the trigger signal and the generation of the output signal. In some aspects, the techniques described herein relate to an apparatus, wherein the TDC includes a counter. In some aspects, the techniques described herein relate to an apparatus, wherein the TDC includes a Vernier delay line. In some aspects, the techniques described herein relate to an apparatus, wherein the TDC includes a delay line.

In some aspects, the techniques described herein relate to an apparatus, wherein: the first circuit is coupled to a first storage element, wherein the first storage element stores the first value or the second value, and the second circuit is coupled to a second storage element, wherein the second storage element stores the third value or the fourth value. In some aspects, the techniques described herein relate to an apparatus, wherein the first circuit and the second circuit are situated in a static random access memory (SRAM) device, and wherein the first storage element is a first SRAM cell, and the second storage element is a second SRAM cell.

In some aspects, the techniques described herein relate to an apparatus, wherein the second circuit is further configured to provide the output signal via an output line, and further including a time storage unit coupled to the output line and configured to store the amount of elapsed time between the trigger signal and the generation of the output signal as a voltage. In some aspects, the techniques described herein relate to an apparatus, wherein the time storage unit includes a capacitor.

In some aspects, the techniques described herein relate to an apparatus, wherein the first circuit includes a capacitor and a current source. In some aspects, the techniques described herein relate to an apparatus, wherein the first circuit further includes a comparator.

In some aspects, the techniques described herein relate to an apparatus, wherein the first circuit includes at least one transistor. In some aspects, the techniques described herein relate to an apparatus, wherein the first circuit further includes a current source.

In some aspects, the techniques described herein relate to an apparatus, wherein the first circuit includes a comparator.

In some aspects, the techniques described herein relate to an apparatus, wherein the first circuit includes at least one logic gate and at least one switch.

In some aspects, the techniques described herein relate to an apparatus, wherein the first circuit includes: a capacitor; a first switch; a second switch; a current source; a switch controller configured to control the first switch; and a comparator, wherein: the first switch is coupled to a first terminal of the capacitor and configured to provide the first value to the capacitor during a sampling phase, a first terminal of the current source is coupled to the first terminal of the capacitor, a second terminal of the current source is coupled to the second switch, the second switch is coupled to a second terminal of the capacitor and is configured to close to allow a charge on the capacitor to vary during a multiplication phase, a first input of the comparator is coupled to the first terminal of the capacitor, a second input of the comparator is coupled to a reference voltage, and an output of the comparator is configured to provide the completion signal to the second circuit.

In some aspects, the techniques described herein relate to an apparatus, wherein the comparator includes an inverter.

In some aspects, the techniques described herein relate to an apparatus, wherein the first circuit includes: a capacitor; a first switch; a second switch; a third switch; a current source; a switch controller configured to control the first switch and the third switch; and a comparator, wherein: the first switch is coupled to a reference voltage and is configured to connect the reference voltage to a first terminal of the capacitor during a sampling phase, a first terminal of the current source is coupled to the first terminal of the capacitor, a second terminal of the current source is coupled to the second switch, the second switch is coupled to a second terminal of the capacitor and is configured to close to allow a charge on the capacitor to vary during a multiplication phase, a first input of the comparator is coupled to the first terminal of the capacitor, the third switch is coupled to a source configured to provide the first value to a second input of the comparator, and an output of the comparator is configured to provide the completion signal to the second circuit.

In some aspects, the techniques described herein relate to an apparatus, wherein the second value includes a first bit, and wherein the first circuit includes: a first switch; a second switch; a third switch; a fourth switch; and a first comparator, wherein: a first terminal of the first switch is configured to obtain the first value, a second terminal of the first switch is configured to obtain an inverse of the first bit, a first terminal of the second switch is configured to obtain a reference voltage, a second terminal of the second switch is configured to obtain the first bit, a third terminal of the first switch is coupled to a third terminal of the second switch, a first terminal of the third switch is coupled to the third terminal of the first switch and the third terminal of the second switch, a second terminal of the third switch and a second terminal of the fourth switch are coupled together and configured to obtain a sampling signal, a third terminal of the third switch is coupled to a first terminal of the fourth switch and to a first input of the first comparator, a third terminal of the fourth switch is coupled to ground, a second input of the first comparator is configured to obtain an inverse of the sampling signal to enable the first comparator, and an output of the first comparator is configured to provide the completion signal to the second circuit.

In some aspects, the techniques described herein relate to an apparatus, wherein the first comparator includes a NOR gate.

In some aspects, the techniques described herein relate to an apparatus, wherein the first switch, the second switch, the third switch, and the fourth switch are transistors.

In some aspects, the techniques described herein relate to an apparatus, further including: a current source; a first transistor; and a second transistor, wherein: the current source is coupled to a first terminal of the first transistor and to a second terminal of the first transistor, a first terminal of the second transistor is coupled to the third terminal of the fourth switch, the second terminal of the first transistor is coupled to a second terminal of the second transistor, a third terminal of the first transistor is coupled to ground, and a third terminal of the second transistor is coupled to ground.

In some aspects, the techniques described herein relate to an apparatus, wherein the second value includes a second bit, wherein the second bit is a next-most-significant bit relative to the first bit, and wherein the second circuit includes: a fifth switch; a sixth switch; a seventh switch; an eighth switch; an third transistor; an inverter; and a second comparator, wherein: a first terminal of the fifth switch is configured to obtain the first value, a second terminal of the fifth switch is configured to obtain an inverse of the second bit, a first terminal of the sixth switch is configured to obtain the reference voltage, a second terminal of the sixth switch is configured to obtain the second bit, a third terminal of the fifth switch is coupled to a third terminal of the sixth switch, a first terminal of the seventh switch is coupled to the third terminal of the fifth switch and the third terminal of the sixth switch, a second terminal of the seventh switch and a second terminal of the eighth switch are coupled together and configured to obtain the completion signal from the first circuit, a third terminal of the seventh switch is coupled to a first terminal of the eighth switch and to a first input of the second comparator, a third terminal of the eighth switch is coupled to a first terminal of the third transistor, a second terminal of the third transistor is coupled to the current source, a third terminal of the third transistor is coupled to ground, an input of the inverter is coupled to the output of the first comparator, a second input of the second comparator is coupled to an output of the inverter, and an output of the second comparator is configured to provide the output signal, wherein a width of the third transistor is substantially half a width of the second transistor.

In some aspects, the techniques described herein relate to an apparatus, wherein the first value and the second value are digital values, and wherein the first value includes at least two bits, the at least two bits including a first bit and a second bit, wherein the first bit is a least-significant bit of the first value and the second bit is a next-least-significant bit of the first value, and wherein the second value includes a third bit, wherein the third bit is a least-significant bit of the second value, and wherein the first circuit includes: a first capacitor having a first capacitance; a second capacitor having a second capacitance, the second capacitance being substantially half of the first capacitance; a first switch; a second switch; a first transistor; and a first comparator, wherein: the first switch is coupled to a first terminal of the first capacitor and is configured to be closed in response to the first bit being equal to 1 and the third bit being equal to 1 and open otherwise, a second terminal of the first capacitor is coupled to the first transistor and to the first comparator, the second switch is coupled to a first terminal of the second capacitor and is configured to be closed in response to the second bit being equal to 1 and the third bit being equal to 1 and open otherwise, a second terminal of the second capacitor is coupled to the first transistor and to the first comparator, and an output of the first comparator is configured to provide the completion signal to the second circuit.

In some aspects, the techniques described herein relate to an apparatus, further including: a current source coupled to the first transistor.

In some aspects, the techniques described herein relate to an apparatus, further including: a first logic gate; and a second logic gate, wherein: a first input of the first logic gate is configured to receive the third bit, a second input of the first logic gate is configured to receive the first bit, an output of the first logic gate is coupled to the first switch, a first input of the second logic gate is configured to receive the third bit, a second input of the second logic gate is configured to receive the second bit, and an output of the second logic gate is coupled to the second switch.

In some aspects, the techniques described herein relate to an apparatus, wherein the first transistor has a first width, and wherein the second value includes a fourth bit, wherein the fourth bit is a next-least-significant bit of the second value, and wherein the second circuit includes: a third capacitor having the first capacitance; a fourth capacitor having the second capacitance; a third switch; a fourth switch; a second transistor, wherein a width of the second transistor is substantially half a width of the first transistor; and a second comparator, wherein: the third switch is coupled to a first terminal of the third capacitor and is configured to be closed in response to the first bit being equal to 1 and the fourth bit being equal to 1 and open otherwise, a second terminal of the third capacitor is coupled to the second transistor and to the second comparator, the fourth switch is coupled to a first terminal of the fourth capacitor and is configured to be closed in response to the second bit being equal to 1 and the fourth bit being equal to 1 and open otherwise, a second terminal of the fourth capacitor is coupled to the second transistor and to the second comparator, and an output of the second comparator is configured to generate the output signal.

In some aspects, the techniques described herein relate to an apparatus, further including: a third logic gate; and a fourth logic gate, wherein: a first input of the third logic gate is configured to receive the fourth bit, a second input of the third logic gate is configured to receive the first bit, an output of the third logic gate is coupled to the third switch, a first input of the fourth logic gate is configured to receive the fourth bit, a second input of the fourth logic gate is configured to receive the second bit, and an output of the fourth logic gate is coupled to the fourth switch.

In some aspects, the techniques described herein relate to an apparatus, wherein the first comparator includes an inverter.

In some aspects, the techniques described herein relate to an apparatus, wherein the second value is a single-bit value.

In some aspects, the techniques described herein relate to an apparatus, wherein the first circuit and the second circuit are situated in an array. In some aspects, the techniques described herein relate to an apparatus, wherein the array includes a plurality of circuits arranged in a pattern of rows and columns. In some aspects, the techniques described herein relate to an apparatus, wherein each of the plurality of circuits is coupled to a respective storage element, and wherein a first storage element coupled to the first circuit stores the first value or the second value, and a second storage element coupled to the second circuit stores the third value or the fourth value. In some aspects, the techniques described herein relate to an apparatus, wherein the first circuit and the second circuit are situated in an SRAM device, and wherein each of the respective storage elements is an SRAM cell. In some aspects, the techniques described herein relate to an apparatus, wherein the first circuit and the second circuit are situated in a same row or a same column of the array. In some aspects, the techniques described herein relate to an apparatus, wherein the first circuit and the second circuit are adjacent in the array.

In some aspects, the techniques described herein relate to an apparatus, wherein: the first circuit is coupled to a first storage element, wherein the first storage element stores the first value or the second value, and the second circuit is coupled to a second storage element, wherein the second storage element stores the third value or the fourth value.

In some aspects, the techniques described herein relate to an apparatus, wherein the first circuit and the second circuit are situated in an SRAM device, and wherein the first storage element is a first SRAM cell, and the second storage element is a second SRAM cell.

In some aspects, the techniques described herein relate to a method of performing a time-domain multiply-and-accumulate (MAC) operation, the method including: in response to a trigger signal, performing a first multiplication of a first value and a second value; generating a completion signal indicating completion of the first multiplication; in response to the completion signal, performing a second multiplication of a third value and a fourth value; and generating an output signal indicating completion of the second multiplication, wherein an amount of elapsed time between the trigger signal and the generation of the output signal represents a sum of the first multiplication and the second multiplication.

In some aspects, the techniques described herein relate to a method, wherein at least two of the first value, the second value, the third value, and the fourth value are a same value. In some aspects, the techniques described herein relate to a method, wherein all of the first value, the second value, the third value, and the fourth value are different values. In some aspects, the techniques described herein relate to a method, wherein at least two of the first value, the second value, the third value, and the fourth value are equal. In some aspects, the techniques described herein relate to a method, wherein at least two of the first value, the second value, the third value, and the fourth value are unequal. In some aspects, the techniques described herein relate to a method, wherein at least one of the first value, second value, third value, or fourth value is a binary value. In some aspects, the techniques described herein relate to a method, wherein at least one of the first value, second value, third value, or fourth value is a single-bit value. In some aspects, the techniques described herein relate to a method, wherein at least one of the first value, second value, third value, or fourth value is a digital value. In some aspects, the techniques described herein relate to a method, wherein at least one of the first value, second value, third value, or fourth value is an analog value.

In some aspects, the techniques described herein relate to a method, wherein, in response to the first value being nonzero and the second value being nonzero, an amount of elapsed time between the trigger signal and the generation of the completion signal is proportional to the first multiplication.

In some aspects, the techniques described herein relate to a method, wherein, in response to at least one of the first value or the second value being zero, an amount of elapsed time between the trigger signal and the generation of the completion signal is a constant amount of time.

In some aspects, the techniques described herein relate to a method, wherein the trigger signal is a first signal edge and the completion signal is a second signal edge. In some aspects, the techniques described herein relate to a method, wherein the output signal is a third signal edge.

In some aspects, the techniques described herein relate to a method, further including: digitizing the amount of elapsed time between the trigger signal and the generation of the output signal. In some aspects, the techniques described herein relate to a method, wherein digitizing the amount of elapsed time between the trigger signal and the generation of the output signal includes a time-to-digital converter (TDC) generating a quantized value representing the amount of elapsed time between the trigger signal and the generation of the output signal.

In some aspects, the techniques described herein relate to a method, further including: storing the amount of elapsed time between the trigger signal and the generation of the output signal as a voltage.

In some aspects, the techniques described herein relate to a method, wherein performing the first multiplication of the first value and the second value includes: during a sampling phase, charging a capacitor to a voltage representing the first value, wherein a capacitance of the capacitor reflects the second value; generating the trigger signal; in response to the trigger signal, discharging the capacitor; and comparing a capacitor node voltage to a reference voltage, and wherein generating the completion signal is in response to the capacitor node voltage falling below the reference voltage.

In some aspects, the techniques described herein relate to a method, wherein performing the first multiplication of the first value and the second value includes: during a sampling phase, charging a capacitor to a reference voltage, wherein a capacitance of the capacitor reflects the second value; providing, to an input of a comparator, an input voltage representing the first value; generating the trigger signal; in response to the trigger signal, discharging the capacitor; and the comparator comparing the input voltage to a capacitor node voltage, and wherein generating the completion signal is in response to the capacitor node voltage falling below the input voltage.

In some aspects, the techniques described herein relate to a system for performing time-domain multiply-and-accumulate (MAC) computations, the system including: a plurality of circuits forming a chain, wherein each of the plurality of circuits is configured to generate a respective indication of an amount of time representing a respective product of a respective input value and a respective weight; and a time-to-digital converter (TDC) coupled to the plurality of circuits and configured to provide a digitized value representing a sum of the respective products generated by the plurality of circuits.

In some aspects, the techniques described herein relate to a system, wherein the plurality of circuits is arranged in an array including at least one row and at least one column.

In some aspects, the techniques described herein relate to a system, wherein each of the plurality of circuits is coupled to a respective storage element configured to store the respective weight.

In some aspects, the techniques described herein relate to a memory device including the system, wherein each of the respective storage elements is a respective memory cell.

In some aspects, the techniques described herein relate to a memory device, wherein the memory device is an SRAM device, and wherein each of the respective memory cells is an SRAM cell.

In some aspects, the techniques described herein relate to a system, wherein each of the plurality of circuits forming the chain is situated in a same row or a same column of the array.

In some aspects, the techniques described herein relate to a system, wherein each of the plurality of circuits includes a respective capacitor, and wherein each of the respective weights is a respective capacitance of the respective capacitor.

In some aspects, the techniques described herein relate to a system, wherein each respective capacitor is a variable-capacitance capacitor.

In some aspects, the techniques described herein relate to a system, wherein each of the plurality of circuits includes a respective transistor, and wherein each of the respective weights is inversely proportional to a respective width of the respective transistor.

BRIEF DESCRIPTION OF THE DRAWINGS

Objects, features, and advantages of the disclosure will be readily apparent from the following description of certain embodiments taken in conjunction with the accompanying drawings in which.

Figure 1:
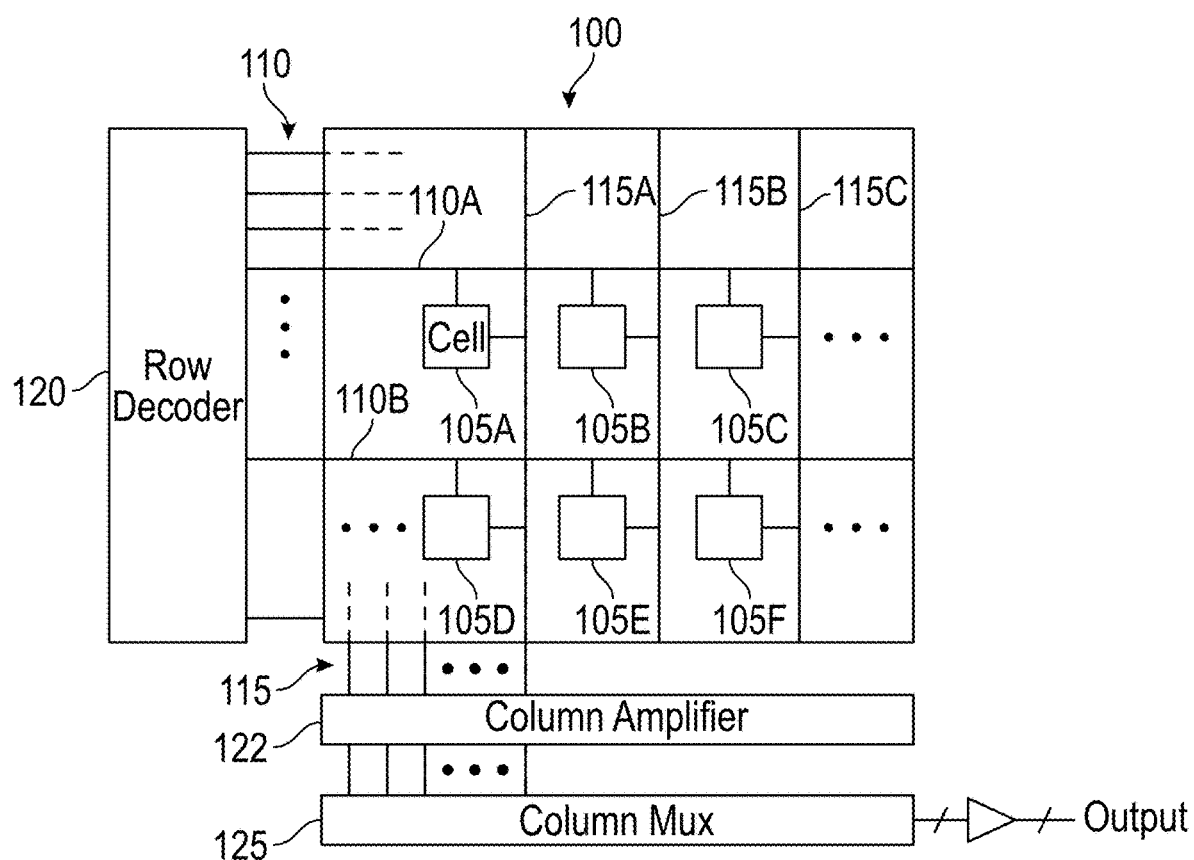
FIG. 1 illustrates an example array that can incorporate the disclosures herein in accordance with some embodiments.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

Many of the drawings herein illustrate multiple instances of a particular item (e.g., cell, row, column, circuit, stage, etc.). Individual instances are labeled by a reference number followed by a letter. For convenience, the written description sometimes refers generally to these items using only the reference number (e.g., cells 105, rows 101, columns 102, etc.).

DETAILED DESCRIPTION

Disclosed herein are devices that implement arithmetic operations (e.g., MAC (multiply and accumulate) computations) inside a data array by processing the data in the time domain. Analog multiplication and/or division operations can be performed locally in a first cell (e.g., a memory cell, a sensor, etc.), and the results can be propagated in the time domain to one or more other (e.g., neighbor) cells. The receipt of the propagated result from the previous cell triggers the next cell's MAC operation. Thus, each cell in a chain starts its multiplying operation when it receives the time signal from the previous cell, and this repeats through the chain. The time span between the start of the chain multiplication in the first cell and the end of the multiplication in the last cell is the accumulation of all the individual products or the MAC result. This disclosed techniques are adaptable and scalable as technology advances.

The drawings herein illustrate and label a variety of components, including, for example, comparators and switches. It will be appreciated by those having ordinary skill in the art that a comparator is a device that compares two values (e.g., two voltages, two currents, etc.) and provides as an output an indication of which of the two values is larger. Comparators can have one or more inputs. An inverter is an example of a comparator with one input. Some comparators with two (or more) inputs compare two inputs. Other comparators with two (or more) inputs compare one of the inputs to, for example, an internal reference value. For example, a comparator can be implemented using a logic gate that has two inputs, but the two inputs are not compared. As a specific example, one of the inputs of a NOR gate used as a comparator can be an enable signal ("enable"). Comparators can be, for example, dynamic comparators or continuous-time comparators. A NOR gate is a dynamic comparator that provides an output of 0 when enable=1, and the comparator is active when enable=0. It will be appreciated by those having ordinary skill in the art that a comparator can be implemented in a variety of ways using various components, whether alone or in combination, including, for example, operational amplifiers, logic gates (e.g., NOR gates), inverters, and the like. The illustration of a particular component (e.g., an operational amplifier, an inverter, a logic gate, etc.) as the comparator in a drawing does not foreclose the use of other components or implementations, instead or in addition, to carry out the functions of the comparator. The drawings illustrate examples, and those having ordinary skill in the art will appreciate that there are other ways to implement the illustrated embodiments without departing from the scope and spirit of the disclosures herein.

It will also be appreciated by those having ordinary skill in the art that a switch is an electrical component that can connect or disconnect a conducting path in an electric circuit. Some of the drawings herein illustrate generic switches. It will be appreciated by those having ordinary skill in the art that a switch can be implemented using a transistor (e.g., a CMOS transistor). Accordingly, some of the drawings herein illustrate transistors as switches. Generally speaking, the switches illustrated in the drawings herein can be implemented by transistors. Similarly, generally speaking, the illustrated transistors can be replaced by a switch. It is to be understood that the illustration of a switch as a transistor does not foreclose the use of other components instead or in addition. Moreover, it will be clear to those having ordinary skill in the art which illustrated transistors are performing as switches. The drawings illustrate examples, and those having ordinary skill in the art will appreciate that there are other ways to implement the illustrated embodiments without departing from the scope and spirit of the disclosures herein.

FIG. 1 illustrates an example array 100 that can incorporate the disclosures herein. The array 100 includes a plurality of cells 105 (e.g., circuits, memory cells, etc.) situated in a rectangular pattern of rows and columns. Data can be stored in each of the cells 105. FIG. 1 shows six cells 105 (cell 105A, cell 105B, cell 105C, cell 105D, cell 105E, and cell 105F), but it is to be appreciated that the array 100 can have fewer or more than six cells 105. In the limit, the array 100 can have a single cell 105 that is configured to perform a time-domain MAC computation by generating a pulse duration that is proportional to the product of an input to the cell 105 and a stored value (e.g., using circuitry as described further below). Each of the cells 105 can be, for example, one of a plurality of circuits configured to perform the operations described herein to contribute to a MAC computation.

The cells 105 shown in FIG. 1 are interconnected by row wires 110 and column wires 115. FIG. 1 shows two row wires 110 within the array 100 (wire 110A and wire 110B) and three column wires within the array 100 (wire 115A, wire 115B, and wire 115C), but it is to be appreciated that the array 100 can have any suitable number of row wires 110 and any suitable number of column wires 115, as will be understood by those having ordinary skill in the art. In FIG. 1, the row wires 110 are connected to a row decoder 120, and the column wires 115 are connected to a column amplifier 122 (which generally amplifies the data), which is connected to a column multiplexer 125. The contents of the cells 105 can be accessed, modified, and/or read using the row decoder 120, the column amplifier 122, and the column multiplexer 125. (The column amplifier 122 and the column multiplexer 125 together can be considered to be a column decoder.)

Individual cells 105 can be read from or written to via the row decoder 120, the column amplifier 122, and the column multiplexer 125 using the appropriate row wire 110 and column wire 115. For example, the cell 105A can be accessed using the wire 110A and the wire 115A, the cell 105B can be accessed using the wire 110A and the wire 115B, the cell 105C can be accessed using the wire 110A and the wire 115C, the cell 105D can be accessed using the wire 110B and the wire 115A, the cell 105E can be accessed using the wire 110B and the wire 115B, and the cell 105F can be accessed using the wire 110B and the wire 115C.

The array 100 can be a memory array, an image array, a fingerprinting array, or, generally, any array that has sensors or cells. As discussed further below, the array 100 can perform MAC operations and provide an output that is the result of a MAC computation. For example, the array 100 can be configured to perform MAC operations using the cells 105 in rows, using the cells 105 in columns, or using a chain of cells 105 within the array 100. The cells 105 in the chain may be situated in the same row or same column of the array 100, or cells 105 in multiple rows and or columns can form a chain for MAC computations.

It is to be appreciated that although FIG. 1 shows a rectangular array 100 with cells 105 that can be accessed via row wires 110 and column wires 115, there is no requirement for the array 100 to have any particular shape or to be accessed in any particular way. In general, the array 100 is any collection of cells 105, situated in any arrangement.

To illustrate MAC computations, assume that it is desired to use an array 100 (e.g., as shown in FIG. 1) to perform the following multiplication:

$$[i_1 \ i_2 \ i_3 \ i_4] \cdot \begin{bmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{bmatrix} = [z_1 \ z_2 \ z_3 \ z_4]$$

The array 100 can store the matrix (e.g., each element of the matrix can be stored in a respective cell 105 of the array 100), and the vector $[i_1 \ i_2 \ i_3 \ i_4]$ can be the input to the array 100.

Figure 2:
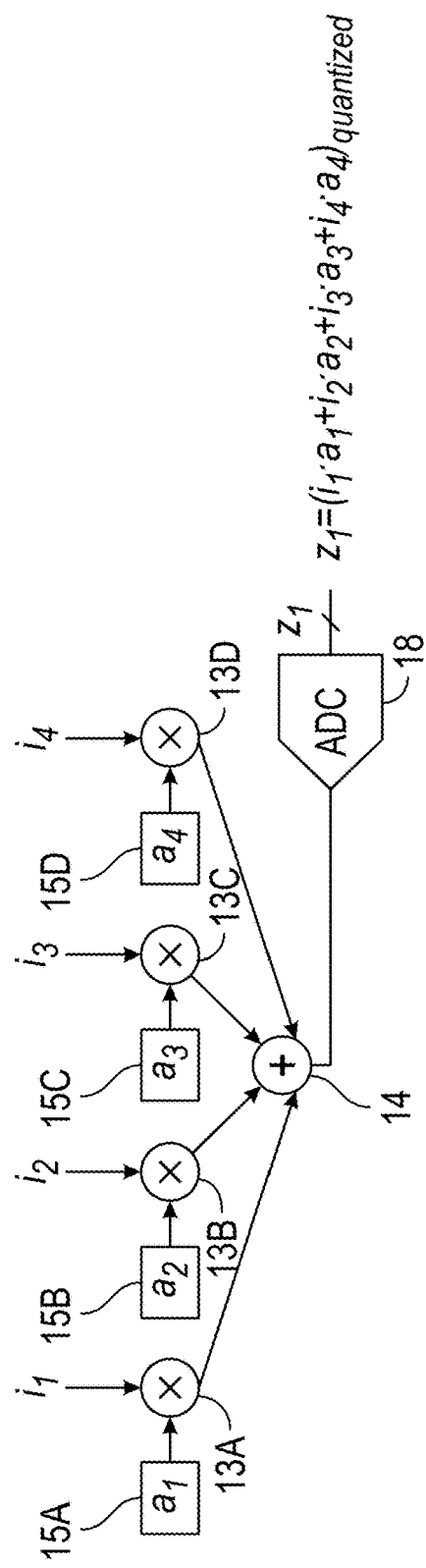
FIG. 2 illustrates one way to perform the multiplication of two vectors in the analog domain.

FIG. 2 illustrates one way to perform the multiplication of two vectors, $[i_1 \ i_2 \ i_3 \ i_4]$, $[a_1 \ a_2 \ a_3 \ a_4]$ (e.g., to calculate $z_1$ of the equation above) in the analog domain. The value $a_1$ is stored in the cell 15A, the value $a_2$ is stored in the cell 15B, the value $a_3$ is stored in the cell 15C, and the value $a_4$ is stored in the cell 15D. The multiplier 13A multiplies the value $a_1$ by the value $i_1$ and provides the result to the adder 14. The multiplier 13B multiplies the value $a_2$ by the value $i_2$ and provides the result to the adder 14. The multiplier 13C multiplies the value $a_3$ by the value $i_3$ and provides the result to the adder 14. Finally, the multiplier 13D multiplies the value $a_4$ by the value $i_4$ and provides the result to the adder 14. The output of the adder 14, which is the desired multiplication $i_1 \cdot a_1 + i_2 \cdot a_2 + i_3 \cdot a_3 + i_4 \cdot a_4$, is then converted from the analog domain to the digital domain by an analog-to-digital converter, ADC 18, which has a resolution in bits. The output of the ADC 18 is the result $z_1 = i_1 \cdot a_1 + i_2 \cdot a_2 + i_3 \cdot a_3 + i_4 \cdot a_4$, quantized to some number of bits. Thus, FIG. 2 shows one way to perform a MAC operation for two vectors, $[i_1 \ i_2 \ i_3 \ i_4]$ and $[a_1 \ a_2 \ a_3 \ a_4]$ in the analog domain. All the dot products are done in parallel, and then the results are added on a common node or bus and converted to the digital domain through the ADC 18.

As explained above, the approach illustrated in FIG. 2 has some drawbacks. For example, the adder 14 can introduce a large capacitance and/or resistance value, which limits the potential energy savings, linearity, and accuracy. In addition, if implemented in an integrated circuit, the ADC can consume significant area and energy for the required number of bits, and the ADC adds a delay at the end of each MAC operation.

Figure 3:
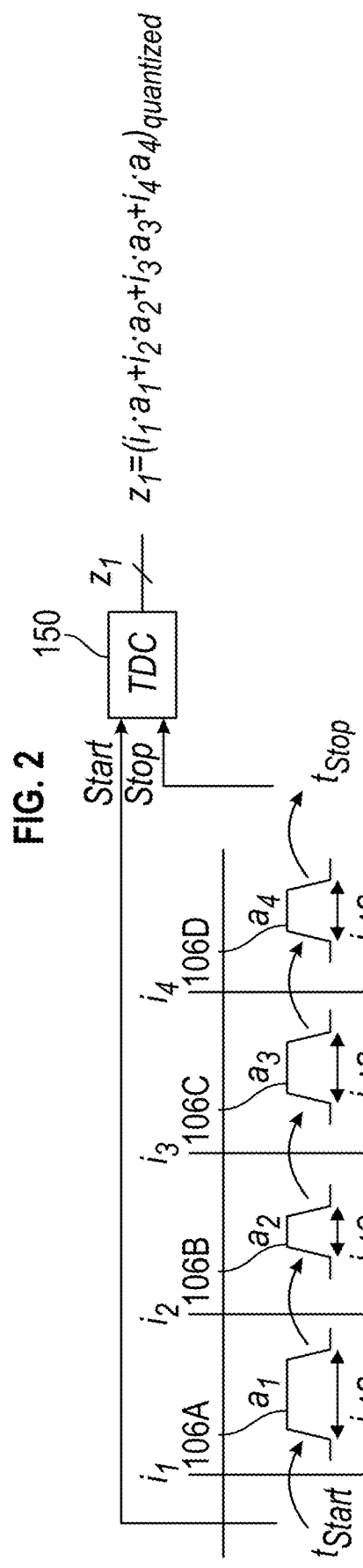
FIG. 3 is an illustration of an exemplary alternative approach to performing MAC computations in the time domain in accordance with some embodiments.

FIG. 3 is an illustration of an exemplary alternative approach to performing MAC computations in the time domain in accordance with some embodiments. A pulse having a width that is proportional to the multiplication or dot product of two numbers is generated for a first cell 105 in a chain, and that pulse is propagated to the next cell 105 in the chain to trigger the next multiplication or dot product. Referring to the specific example shown in FIG. 3, the pulse 106A in the cell 105A starts at the time $t_{start}$ and has a duration (also referred to as length or width in time) that is equal to $i_1 \cdot a_1$. In the example of FIG. 3, the falling edge of the pulse 106A triggers the generation of the pulse 106B in the cell 105B, which has a duration of $i_2 \cdot a_2$. Similarly, the falling edge of the pulse 106B triggers the generation of the pulse 106C in the cell 105C, which has a duration of $i_3 \cdot a_3$. Finally, the falling edge of the pulse 106C triggers the generation of the pulse 106D in the cell 105D, which has a duration of $i_4 \cdot a_4$. The falling edge of the pulse 106D occurs at the time $t_{stop}$. Because the pulse 106A, pulse 106B, pulse 106C, and pulse 106D are concatenated, and there is no time gap between them, the total amount of time between the start of the pulse 106A ($t_{start}$) in the chain (in the cell 105A) and the end of the pulse 106D ($t_{stop}$) in the last cell of the chain (the cell 105D) is the accumulation of all of the dot products. In other words, the accumulation happens as the time passes. The difference between $t_{stop}$ and start is the value of $z_1$, which can be converted to digital format by a time-to-digital converter (TDC) 150. The conversion by the TDC 150 can be simultaneous with the MAC operation, thereby eliminating a delay at the end of the operation. The TDC 150 can comprise, for example, a counter, a Vernier delay line, or a delay line. The TDC can be provided the start time $t_{start}$ in any suitable manner. For example, the TDC 150 can be connected to a signal line that provides the pulse 106A. As another example, the TDC 150 can receive a global clock signal (e.g., via a clock line or input).

Figure 4:
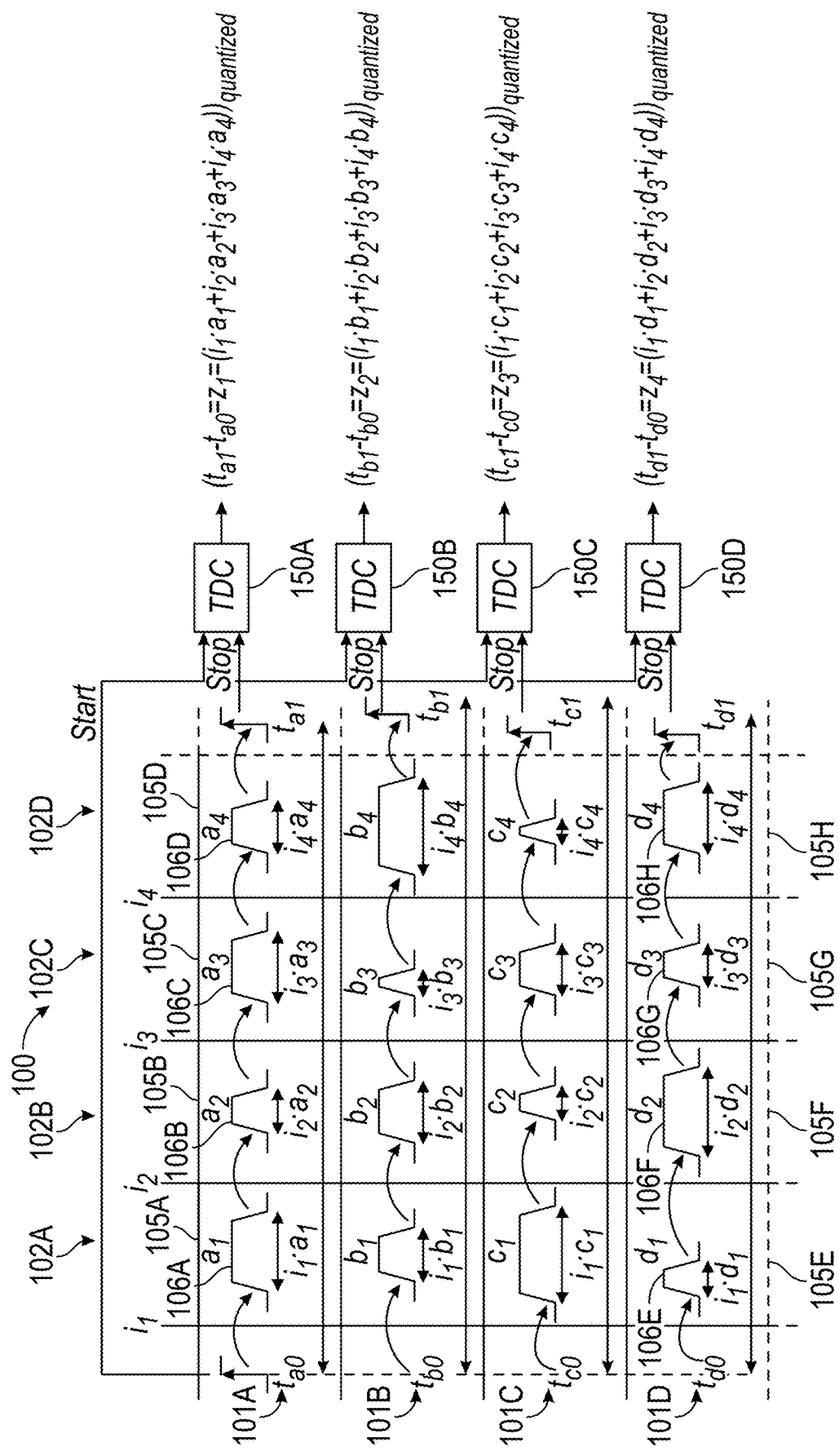
FIG. 4 is an example of a time-domain MAC computation in an array in accordance with some embodiments.

FIG. 4 is an example of a time-domain MAC performed using an array 100 in accordance with some embodiments. Specifically, FIG. 4 illustrates how the product $$[i_1 \ i_2 \ i_3 \ i_4] \cdot \begin{bmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{bmatrix} = [z_1 \ z_2 \ z_3 \ z_4]$$

can be computed using the approach described above in the context of FIG. 3. The array 100 shown in FIG. 4 is a rectangular array with rows and columns. FIG. 4 shows the row 101A, the row 101B, the row 101C, the row 101D, the column 102A, the column 102B, the column 102C, and the column 102D. Each of the MAC products $[z_1 \ z_2 \ z_3 \ z_4]$ is generated in a separate row of the array 100. Specifically, the value of $z_1$ is computed in the row 101A, the value of $z_2$ is computed in the row 101B, the value of $z_3$ is computed in the row 101C, and the value of $z_4$ is computed in the row 101D. The overall product (MAC result) for each row is the time difference between the starting time of the first pulse in that row (labeled as $t_{a0}$, $t_{b0}$, $t_{c0}$, and $t_{d0}$, respectively, for the rows 101A, 101B, 101C, and 101D shown in FIG. 4) and the end time of the last pulse (e.g., labeled as $t_{a1}$, $t_{b1}$, $t_{c1}$, and $t_{d1}$, respectively, for the rows 101A, 101B, 101C, and 101D).

In the example of FIG. 4, the weight matrix is stored in the array 100, and the input signal $[i_1 \ i_2 \ i_3 \ i_4]$ provides the input for all of the cells 105 in a respective column of the array. Specifically, the value of $i_1$ is the input for all of the cells 105 in the column 102A, the value of $i_2$ is the input for all of the cells 105 in the column 102B, the value of $i_3$ is the input for all of the cells 105 in the column 102C, and the value of $i_4$ is the input for all of the cells 105 in the column 102D.

In each of the cells 105, a pulse is generated, and its width is proportional to the product of the corresponding input (in) and the weight stored in the cell 105. (It will be appreciated that the input and the weight are two factors for a multiplication operation.) In the example of FIG. 4, other than the first pulse in the chain, which is triggered by an external signal, the generation of each subsequent pulse is triggered by the falling edge of the pulse in the previous cell 105. Therefore, for each row of the array 100, the time between the rising edge of the first pulse in the row and the falling edge of the last pulse in the row is the sum of all the pulse widths or multiplication products as shown by the formulas provided in FIG. 4. For each row of the array 100, a TDC 150, which can operate in parallel with the pulse generation, measures the time between the start of the first pulse and the end of the last pulse in the row, and the output of the TDC 150 is the digitized value of the MAC operation(s) in that row. The computation of the value of $z_1$ in FIG. 4 is as described in the discussion of FIG. 3. Each of the values $z_2$, $z_3$, and $z_4$ can be determined in the same manner, with each of the rows having a respective start time ($t_{start,k}$, denoted as $t_{a0}$, $t_{b0}$, $t_{c0}$, and $t_{d0}$, respectively, for the rows 101A, 101B, 101C, and 101D) and a respective end time ($t_{stop,k}$, denoted as $t_{a1}$, $t_{b1}$, $t_{c1}$, and $t_{d1}$, respectively, for the rows 101A, 101B, 101C, and 101D).

As a specific example, the components that contribute to the value of $z_4$ in the row 101D are labeled in FIG. 4. The pulse 106E in the cell 105E starts at the time $t_{d0}$ and has a duration that is equal to $i_1 \cdot d_1$. The falling edge of the pulse 106E triggers the generation of the pulse 106F in the cell 105F, which has a duration of $i_2 \cdot d_2$. Similarly, the falling edge of the pulse 106F triggers the generation of the pulse 106G in the cell 105G, which has a duration of $i_3 \cdot d_3$. Finally, the falling edge of the pulse 106G triggers the generation of the pulse 106H in the cell 105H, which has a duration of $i_4 \cdot d_4$. The falling edge of the pulse 106H occurs at the time $t_{d1}$. The difference between $t_{d1}$ and $t_{d0}$ is $z_4$, the accumulation of all of the dot products contributing to the value of $z_4$.

As shown in FIG. 4, each of the rows of the array 100 is coupled to a respective TDC 150. The row computing $z_1$ is coupled to the TDC 150A, the row computing $z_2$ is coupled to the TDC 150B, the row computing $z_3$ is coupled to the TDC 150C, and the row computing $z_4$ is coupled to the TDC 150D. As explained above, each TDC 150 provides, as output, a quantized value of its input (which is an analog product).

It will be appreciated that the start times (start for multiple rows can be (but are not required to be) the same. For example, the MAC operations in all of the rows of an array 100 (e.g., the row 101A, row 101B, row 101C, and row 101D in FIG. 4) can be triggered at the same time (e.g., by a clock signal). Because the weights stored in the cells 105 are different for the different rows, even if the start times for the rows are the same, the stop times for the different rows are independent of each other and are, in general, different. Thus, it will also be appreciated that the end times for different rows likely differ due to the differences in pulse duration (and, therefore, when the last pulse's falling edge occurs).

It is also to be appreciated that the values $z_1$, $z_2$, $z_3$, and $z_4$ can be computed independently of each other, and each can proceed according to its own timing. Thus, the start times and/or end times for different rows/columns (or, generally, computation paths or chains) need not be synchronized with each other or with any clock signal. It may be convenient in some applications for the start time to be the same for multiple rows (e.g., set by a clock or other trigger signal), but this is not a requirement.

Moreover, although FIG. 4 illustrates the operations being performed over rows of the array 100 (e.g., the computation chain proceeds along a row of the array 100), it is to be appreciated that a similar approach can be implemented to compute MAC operations over the columns of the array instead of or in addition to the rows. Furthermore, although the example of FIG. 4 shows only four cells 105 in each row, it is to be understood that the array 100 can have any number of cells 105 desired for MAC operations. The MAC operations can be performed over an entire row, an entire column, a portion of a row, or a portion of a column.

Figure 5:
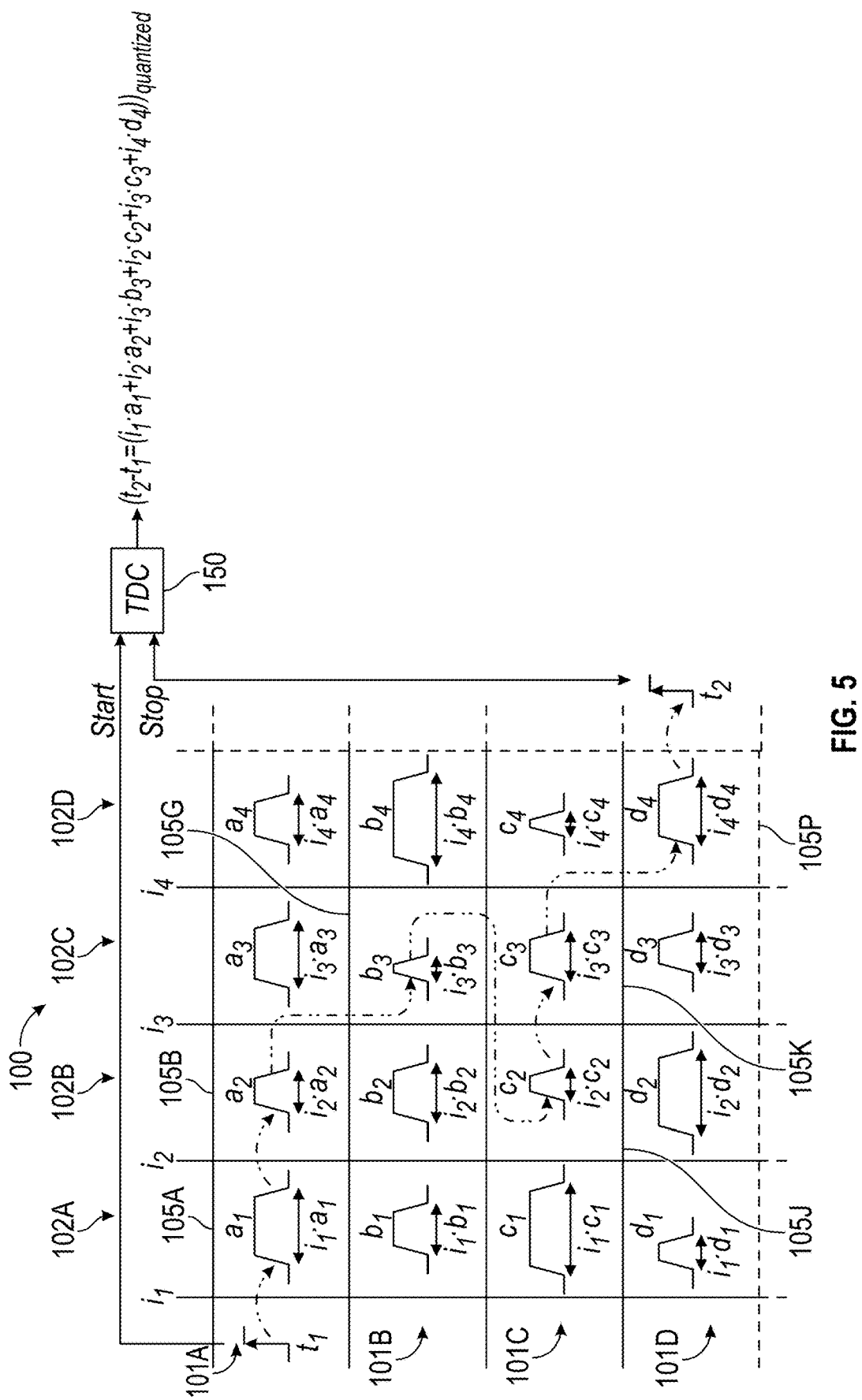
FIG. 5 is another example of a time-domain MAC computation in an array in accordance with some embodiments.

Furthermore, although FIG. 4 illustrates an example in which the computation follows a linear path within the array 100, there is no requirement for MAC operations to proceed in a linear path within the array 100. As an example, FIG. 5 illustrates that MAC operations can proceed via neighboring cells 105 in different mixes of columns and rows, and/or in different directions. As shown in the example of FIG. 5, the pulse generated for a particular cell 105 can, in general, trigger the generation of pluses in some or all neighbor cells 105 in its vicinity in whatever directions those cells 105 happen to be. In FIG. 5, the computation proceeds from cell 105A to cell 105B in row 101A. It then proceeds to cell 105G in row 101B. From there, the end of the pulse triggers generation of a pulse in cell 105J in row 101C. The pulse then travels to cell 105K, also in row 101C, and finally to cell 105P in row 101D. The result of the example operation illustrated in FIG. 5 is the quantized (by the TDC 150) difference between the time at which the falling edge of the last pulse (in cell 105P) occurs and the time at which the rising edge of the first pulse (in cell 105A) occurs:

$$t_2 - t_1 = (i_1 \cdot a_1 + i_2 \cdot a_2 + i_3 \cdot b_3 + i_2 \cdot c_2 + i_3 \cdot c_3 + i_4 \cdot d_4)_q,$$

where the subscript q indicates a quantized value.

Therefore, as the example of FIG. 5 illustrates, the chain of a MAC computation can be formed in any direction between neighbor cells 105.

It is to be appreciated that, given an array 100 of cells 105, a MAC computation can, in general, be computed in accordance with the techniques disclosed herein regardless of how those cells 105 are situated. In other words, is it not necessary for the chain to proceed between neighbor cells 105. For example, time-domain MAC operations can be done in an asynchronous way between randomly/arbitrarily located and/or distributed cells 105 (e.g., memory cells, pixels, sensors, etc.) in an asynchronous fashion. The disclosures herein are not limited to any particular array 100 format and can be applied to arrays 100 of scattered or distributed cells 105.

Figure 6:
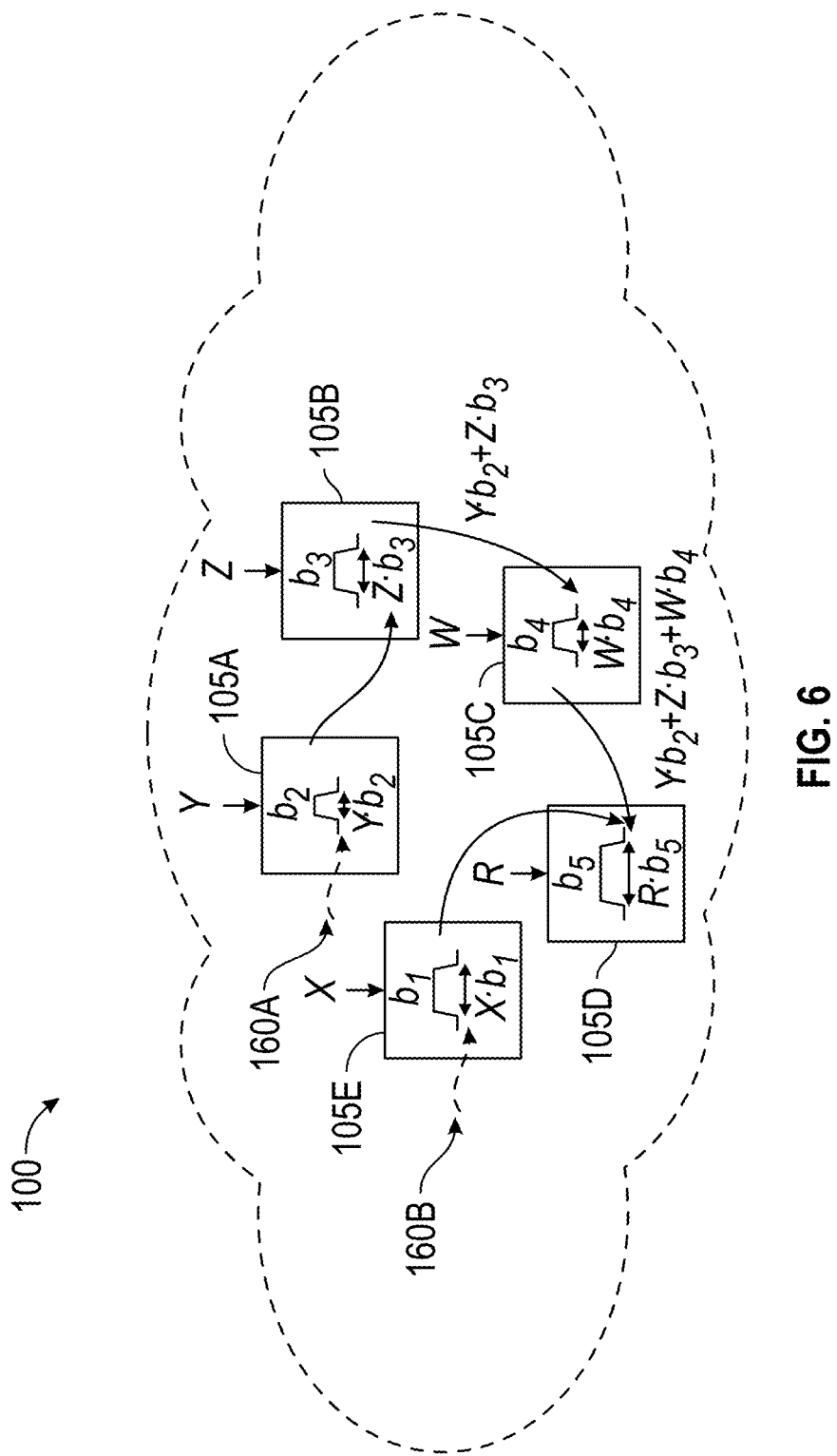
FIG. 6 illustrates an example array comprising a collection of arbitrarily-located cells that can be used to compute various MAC operations in accordance with some embodiments.

FIG. 6 illustrates an example array 100 comprising a collection of cells 105 in an arbitrary pattern that can be used to compute various MAC operations. Specifically, different paths through the cells 105 of the array 100 can be taken to compute different MAC operations. FIG. 6 shows two example paths. The path 160A proceeds from the cell 105A (which computes $Y \cdot b_2$) to the cell 105B (which adds $Z \cdot b_3$) to the cell 105C (which adds $W \cdot b_4$), and finally to the cell 105D (which adds $R \cdot b_5$). The overall product obtained via the path 160A is $Y \cdot b_2 + Z \cdot b_3 + W \cdot b_4 + R \cdot b_5$, which can then be quantized by a TDC 150. The path 160B proceeds from the cell 105E (which computes $X \cdot b_1$) to the cell 105D (which adds $R \cdot b_5$). The overall product obtained via the path 160B is $X \cdot b_1 + R \cdot b_5$, which can then be quantized by a TDC 150 (which may be the same TDC 150 used to quantize the result of the path 160A or a different TDC 150).

It is to be appreciated that each cell 105 should be included in only one chain at a time, although the chains may be configurable or programmable. For example, an array 100 may have the flexibility to allow chains to be defined at one point in time and later deleted/erased to allow different chains to be defined. Alternatively, the chains can be predefined (e.g., established/hard-wired when an integrated circuit comprising the array 100 is fabricated).

Some of the explanations above (e.g., of FIGS. 3, 4, etc.) describe generating individual, discrete pulses in each of the cells 105 involved in a MAC computation chain. It is to be appreciated that other approaches are possible and are within the scope of the disclosures herein. For example, rather than generate a physical pulse 106 having a length corresponding to the product of an input value and a stored value, any combination of rising and/or falling edges can be used as a proxy for pulse duration for a MAC computation (or constituent product). Thus, the product in each cell 105 can be, for example, the length of a pulse 106 in the time domain (as described above and illustrated, e.g., in FIGS. 3-6), or each product can be represented simply by the time span between two signal edges (e.g., rising/rising, rising/falling, falling/rising, or falling/falling). The edge that triggers a multiplication in a cell 105 can be referred to as a triggering edge, and the edge that ends the multiplication can be referred to as an ending edge. The ending edge in each cell 105 (other than the last cell 105 in the chain) triggers the multiplication in the next cell 105 in the chain. Therefore, the individual products determined in each cell 105 can be added in the time domain even if a physical pulse is not generated in each of the cells 105.

Accordingly, in some embodiments, a rising (or falling) edge signal (a triggering edge) triggers the multiplication in a first cell 105 of a chain of cells 105 used in a MAC computation, and a rising (or falling) edge is generated at the end of the multiplication (an ending edge) in that first cell 105, which triggers the multiplication in the next cell 105 in the chain, etc. The time span between the triggering edge in the first cell 105 of the chain and the ending edge in the first cell 105 provides the component of the overall MAC operation provided by the first cell 105 (the product of two values: an input value and a stored value). The triggering edge and the ending edge can be, respectively, a rising edge and a falling edge, a falling edge and a rising edge, a rising edge and a rising edge, or a falling edge and a falling edge. The times between the respective triggering and ending edges in the rest of the cells 105 in the chain likewise correspond to their contributions to (constituent products of) the overall MAC operation. A TDC 150 in parallel starts measuring the time between the triggering and ending edges in the cells 105, starting from the first cell 105 in the chain and progressing through the chain (e.g., a row of an array 100). The output of the TDC 150 is the digitized value of the overall MAC operation.

Figure 7:
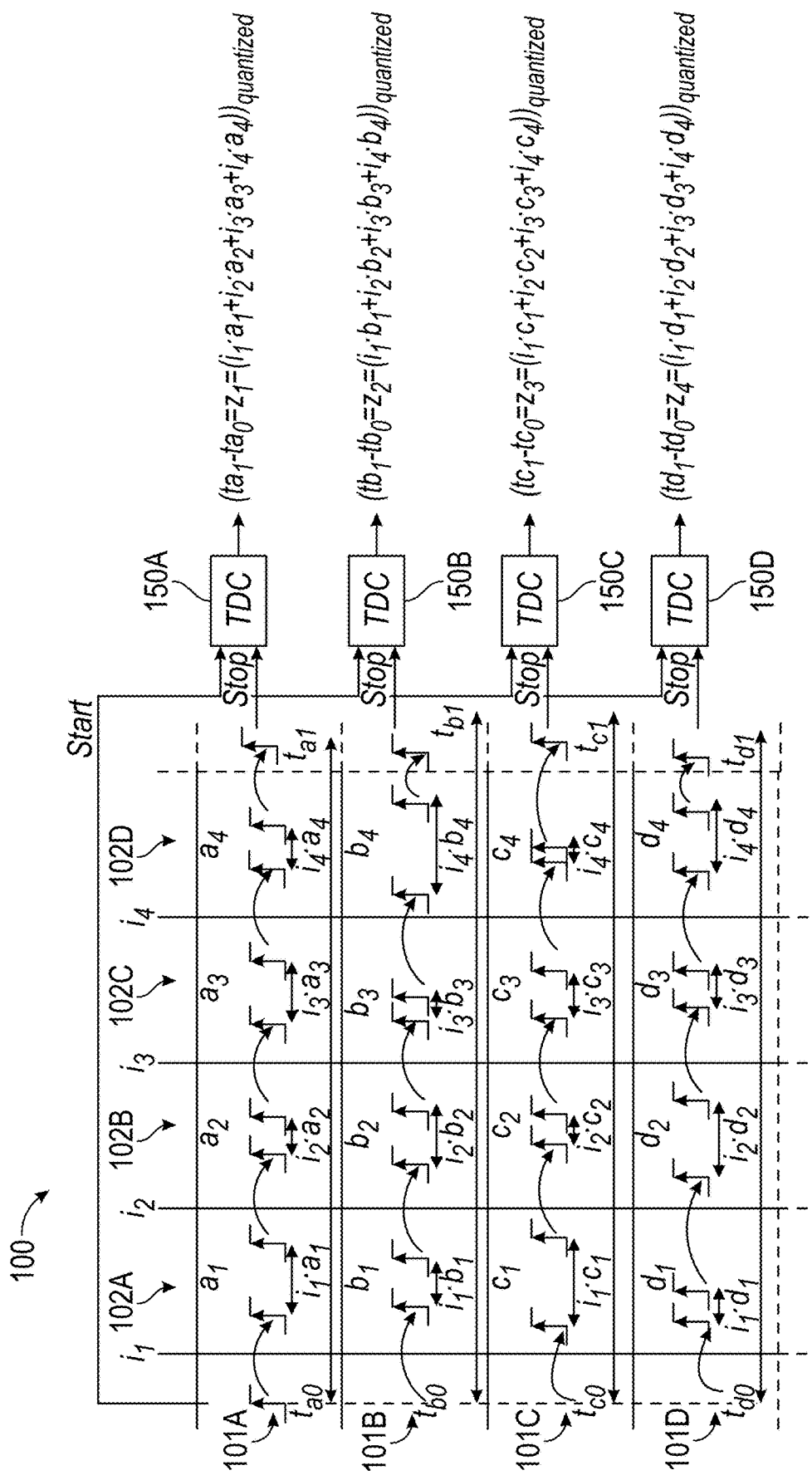
FIG. 7 illustrates an example of MAC computations in an array in accordance with some embodiments.

FIG. 7 illustrates an example in accordance with some embodiments. In the illustrated example, rising edges are used for both the triggering edges and the ending edges. Assuming the TDCs 150 in FIG. 7 are identical to those in FIG. 4 (e.g., same resolution), the embodiment of FIG. 7 provides the same result as the embodiment of FIG. 4.

There are many types of circuits the cells 105 can use to generate a pulse width or time span that is proportional to (or equal to) the dot product of two values. One approach is to discharge a charged capacitor with a constant current source (or charge a discharged capacitor). The discharge (or charge) time, ΔT, is proportional to the voltage difference on the capacitor, ΔV, multiplied by the capacitor value, $C_s$, and divided by the constant current $I_d$, as provided by the following equation:

$$\Delta T = \Delta V \cdot \frac{C_s}{I_d}$$

Figure 8A:
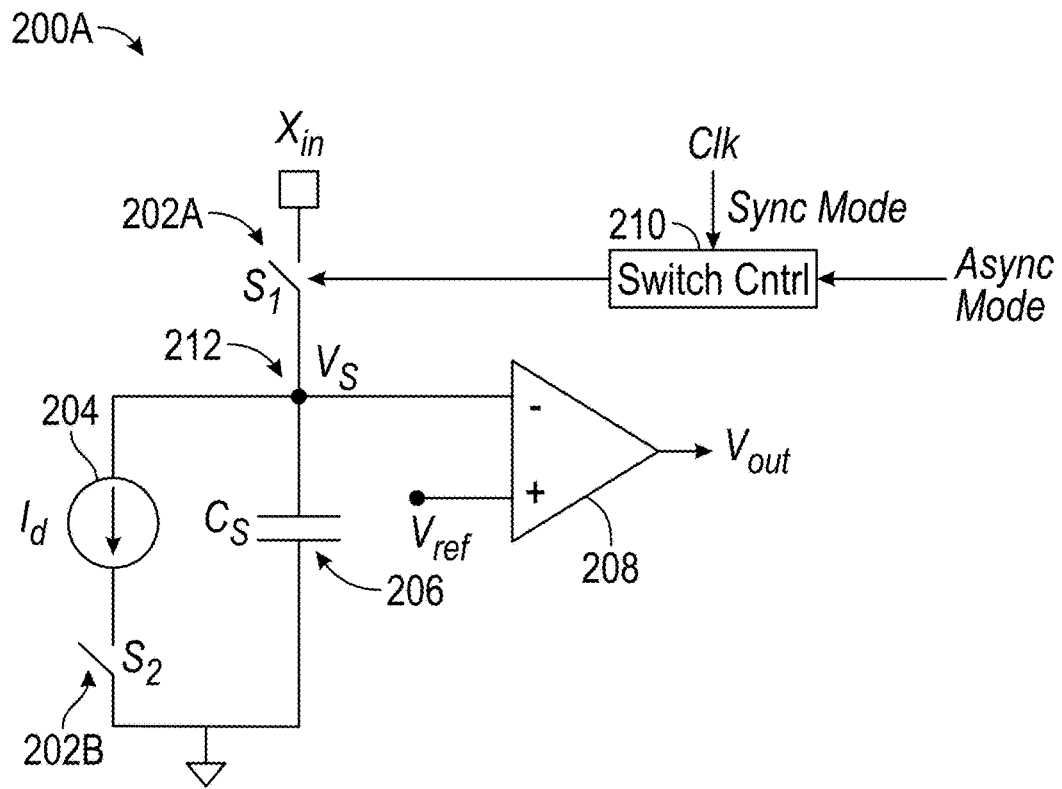
FIG. 8A illustrates an example circuit in accordance with some embodiments.

FIG. 8A illustrates an example circuit 200A in accordance with some embodiments. The circuit 200A can be used to generate a pulse width (or indication of an amount of time) proportional to $$X_{in} \cdot \frac{C_s}{I_d},$$

where $X_{in}$ is the input signal and the weight of the multiplication is $$\frac{C_s}{I_d}.$$

As illustrated in FIG. 8A, the circuit 200A includes a switch 202A, a switch 202B, a current source 204, a capacitor 206, a comparator 208, and a switch control 210 situated as illustrated. The capacitance of the capacitor 206, $C_s$, is the weight of the multiplication. It is to be appreciated that the weight can be made adjustable by making the capacitor 206 a variable-capacitance capacitor. The switch 202A samples the signal on the capacitor 206. The switch 202A can be controlled by a synchronous or asynchronous signal, depending on the application. The circuit 200A is capable of operating in a synchronous mode, in which the operation is triggered (controlled) by a clock signal, or in an asynchronous mode, in which the operation is triggered by the output of another (e.g., prior) stage. In the synchronous mode, the switch control 210 controls the position of the switch 202A based on a clock signal, and in the asynchronous mode, the switch control 210 controls the position of the switch 202A without the use of a clock signal (e.g., based on the output of another stage). The switch 202B can be controlled by a "start" signal, described further below. The comparator 208 has a first input connected to the node 212 and a second input connected to a reference voltage, $V_{ref}$.

Thus, FIG. 8A is an example of a circuit that comprises a capacitor 206, a switch 202A, a switch 202B, a current source 204, a switch control 210 configured to control the switch 202A, and a comparator 208. The switch 202A is coupled to a first terminal of the capacitor 206 and configured to provide the value $X_{in}$ to the capacitor 206 during a sampling phase (e.g., when the switch 202A is closed). A first terminal of the current source 204 is coupled to the first terminal of the capacitor 206, and a second terminal of the current source 204 is coupled to the switch 202B. The switch 202B is coupled to a second terminal of the capacitor 206 and is configured to close to allow the capacitor 206 to discharge during a multiplication phase. The switch 202A and switch 202B can be implemented using, for example, transistors. A first input of the comparator 208 (e.g., the "−" input) is coupled to the first terminal of the capacitor 206, a second input of the comparator 208 (e.g., the "+" input) is coupled to a reference voltage $V_{ref}$, and an output of the comparator 208 is configured to provide a completion signal $V_{out}$ to a following circuit. As described further below (e.g., in the discussion of FIG. 8C), the comparator 208 can be, for example, an inverter or any other component or combination of components that compares two values and provides as output an indication of which is larger.

Figure 8B:
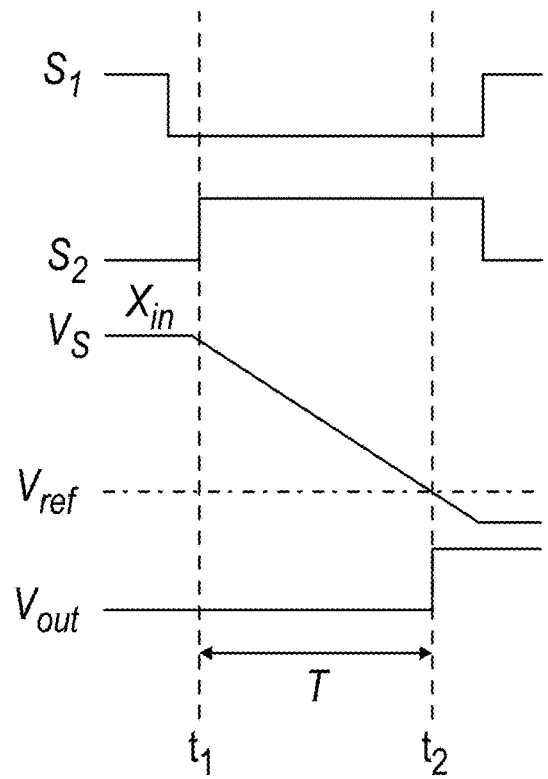
FIG. 8B illustrates the operation of the circuit of FIG. 8A.

FIG. 8B illustrates the operation of the circuit 200A. At the beginning of the operation, in either synchronous or asynchronous mode, the switch 202A is in the closed position, and the switch 202B is in the open position. As a result, the capacitor 206 charges to the voltage $V_s = X_{in}$ (and, therefore, the node 212 is at a voltage $V_s = X_{in}$). The switch 202A is then opened. At this point in time, the capacitor 206 is charged to the voltage $V_s = X_{in}$, and, assuming that $X_{in}$ is always larger than $V_{ref}$, the output, $V_{out}$, of the comparator 208 is low because the value of $V_{ref}$ is below $V_s$. The switch 202B is then closed at time $t_1$, which is the start of the multiplication period. (The time $t_1$ corresponds to the triggering edge or beginning of the pulse generated for the cell 105.) The capacitor 206 begins discharging with current $I_d$, which causes the voltage of the node 212 to decrease. At the time $t_2$, the voltage $V_s$ at the node 212 (the voltage on the capacitor 206) reaches the reference voltage $V_{ref}$, which causes the output of the comparator 208 to go high (the comparator 208 is said to flip), thereby ending the multiplication period. (The time $t_2$ corresponds to the ending edge or the end of the pulse generated for the cell 105.) The difference in time between the switch 202B closing and the output of the comparator 208 going high is given by $$T = (V_{ref} - X_{in}) \cdot \frac{C_s}{I_d},$$

which is proportional to $$X_{in} \cdot \frac{C_s}{I_d}.$$

It is to be appreciated that the polarity of the comparator 208 in FIG. 8A can be reversed so that the capacitor 206 charges instead of discharges during the multiplication period. Generally speaking, during the multiplication phase, an amount of charge on the capacitor varies.

Figure 8C:
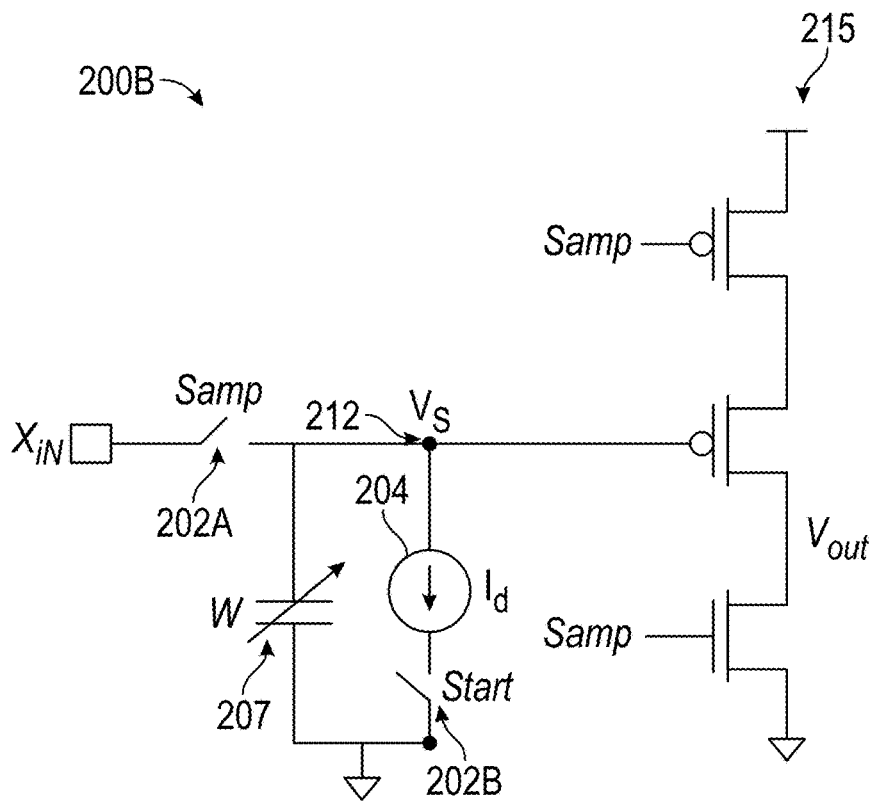
FIG. 8C illustrates another example circuit in accordance with some embodiments.
Figure 8D:
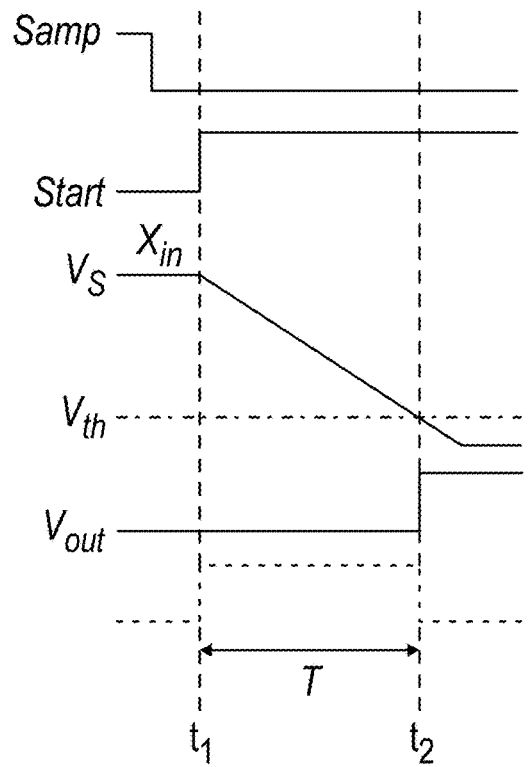
FIG. 8D illustrates the operation of the circuit of FIG. 8C.

FIG. 8C illustrates another example circuit 200B in accordance with some embodiments, and FIG. 8D illustrates the operation of the circuit 200B. The circuit 200B is one way to implement the example circuit 200A of FIG. 8A. The capacitor 207 is a variable-capacitance capacitor so that its capacitance can be set in accordance with the weight of the multiplication, which allows the circuit 200B to compute a variety of products using different weights. As illustrated in the circuit 200B of FIG. 8C, the comparator 208 can be implemented using a dynamic inverter 215. During a sampling phase, a sampling signal takes a first value, illustrated in FIG. 8D as high ("samp"=1), the switch 202A is closed, and the capacitor 207 charges to some level corresponding to the value of $X_{in}$. At the end of the sampling phase, the node 212 is at the value of $V_s = X_{in}$ as shown in FIG. 8D, and the output, $V_{out}$, of the dynamic inverter 215 is zero/low. After the sampling phase is completed ("samp"=0), the switch 202A is opened, and, at time $t_1$, the switch 202B is closed ("start"=1). The dynamic inverter 215 is now active, the variable-capacitance capacitor 207 begins discharging, and the inverter output $V_{out}$ goes high when the voltage at node 212 falls below the threshold voltage, $V_{th}$, of the dynamic inverter 215. The difference between $t_2$ and $t_1$ is given by $$T = (V_{th} - X_{in}) \cdot \frac{C_s}{I_d},$$

which is proportional to $$X_{in} \cdot \frac{C_s}{I_d}.$$

It is to be appreciated that the polarity of the dynamic inverter 215 in FIG. 8C can be reversed so that the capacitor 207 charges instead of discharges during the multiplication period. Generally speaking, during the multiplication phase, an amount of charge on the capacitor varies.

Figure 9A:
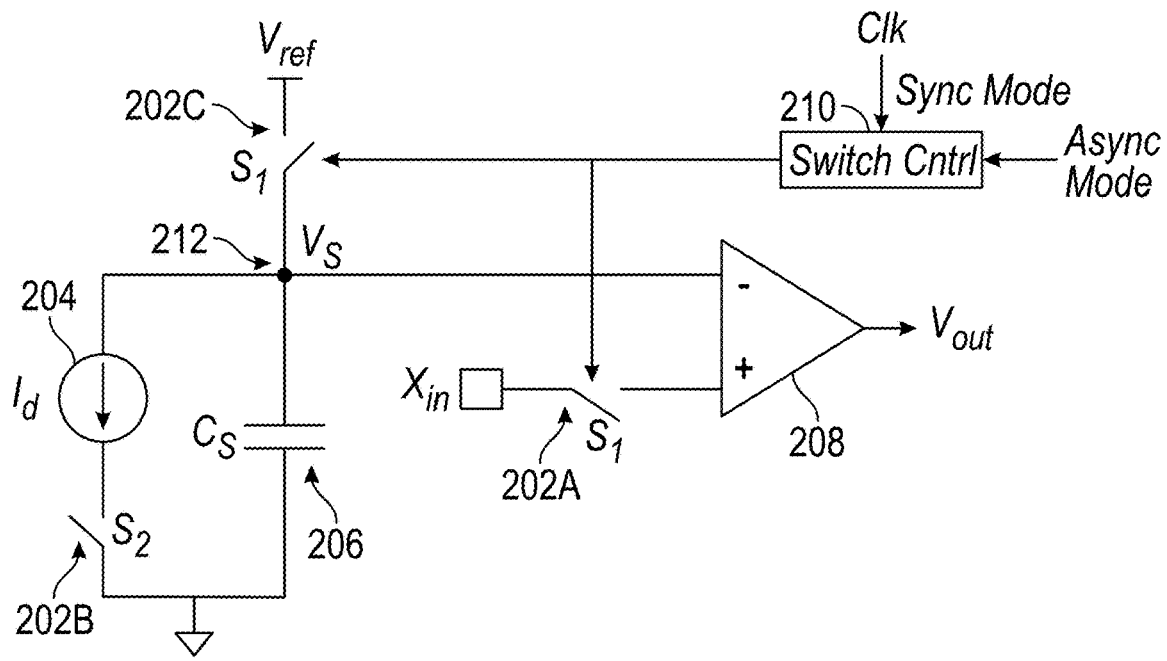
FIG. 9A illustrates another example circuit in accordance with some embodiments.

FIG. 9A illustrates another example circuit 200C that can be used to generate a pulse width (or measure of time) proportional to $$X_{in} \cdot \frac{C_s}{I_d},$$

where $X_{in}$ is the input signal and the weight of the multiplication is $$\frac{C_s}{I_d}.$$

As illustrated in FIG. 9A, the circuit 200C includes a switch 202A, a switch 202B, a switch 202C, a current source 204, a capacitor 206, a comparator 208, and a switch control 210 situated as shown. The weight can be made adjustable by making the capacitor 206 a variable-capacitance capacitor. The switch 202A connects the input signal $X_{in}$ to the positive input of the comparator 208, and the switch 202C connects the reference voltage, $V_{ref}$, to the negative input of the comparator 208. The switches 202A and 202C can operate synchronously with each other, and they can be controlled by a synchronous or asynchronous signal, depending on the application. The circuit 200C is capable of operating in a synchronous mode, in which the operation is triggered (controlled) by a clock signal, or in an asynchronous mode (e.g., in which the operation is triggered by an output from another stage). In the synchronous mode, the switch control 210 controls the positions of the switch 202A and the switch 202C based on a clock signal, and in the asynchronous mode, the switch control 210 controls the positions of the switch 202A and the switch 202C without the use of a clock signal (e.g., based on the output from a previous stage).

Thus, FIG. 9A is an example of a circuit that comprises a capacitor 206, a switch 202C, a switch 202B, a switch 202A, a current source 204, a switch control 210, and a comparator 208. The switch 202C is coupled to a reference voltage $V_{ref}$ and is configured to connect the reference voltage to a first terminal of the capacitor 206 during a sampling phase. A first terminal of the current source 204 is coupled to the first terminal of the capacitor 206, and a second terminal of the current source 204 is coupled to the switch 202B. The switch 202B is coupled to a second terminal of the capacitor 206 and is configured to close to allow the capacitor 206 to discharge during a multiplication phase. A first input of the comparator 208 (e.g., the "−" input) is coupled to the first terminal of the capacitor 206. The switch 202A is coupled to a source configured to provide the first value $X_{in}$ to a second input (e.g., the "+" input) of the comparator 208. An output of the comparator 208 is configured to provide a completion signal $V_{out}$ to a following circuit.

As explained above in the discussion of FIG. 8A, the polarity in FIG. 9A can be reversed so that the capacitor 206 charges, rather than discharges, during the multiplication phase.

Figure 9B:
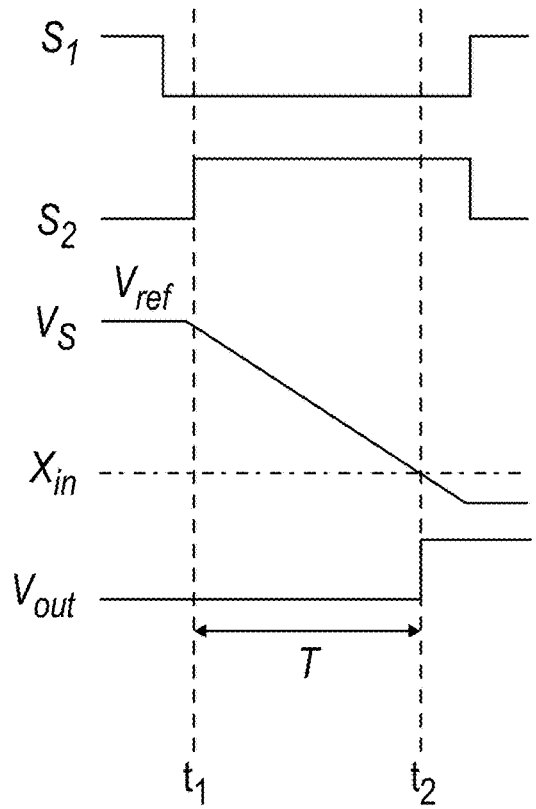
FIG. 9B illustrates the operation of the circuit of FIG. 9A.

FIG. 9B illustrates the operation of the circuit 200C. At the beginning of the operation, in either synchronous or asynchronous mode, the switches 202A and 202C are in the closed position, and the switch 202B is in the open position. As a result, the capacitor 206 charges to the voltage $V_s = V_{ref}$ (and, therefore, the node 212 is at a voltage $V_s = V_{ref}$). The switch 202C is then opened. At this point in time, the capacitor 206 is charged to the voltage $V_s = V_{ref}$, and, assuming that $X_{in}$ is always smaller than $V_{ref}$, the output of the comparator 208 is low because the value of $X_{in}$ is below $V_s$. The switch 202B is then closed at time $t_1$, which is the start of the multiplication period. The capacitor 206 begins discharging with current $I_d$, which causes the voltage of the node 212 to decrease. At the time $t_2$, the voltage $V_s$ at the node 212 (the voltage on the capacitor 206) reaches the input value $X_{in}$, which causes the output of the comparator 208 to go high (the comparator 208 is said to flip), thereby ending the multiplication period. The difference in time between the switch 202B closing and the output of the comparator 208 going high is given by $$T = (V_{ref} - X_{in}) \cdot \frac{C_s}{I_d},$$

which is proportional to $$X_{in} \cdot \frac{C_s}{I_d},$$

Figure 10A:
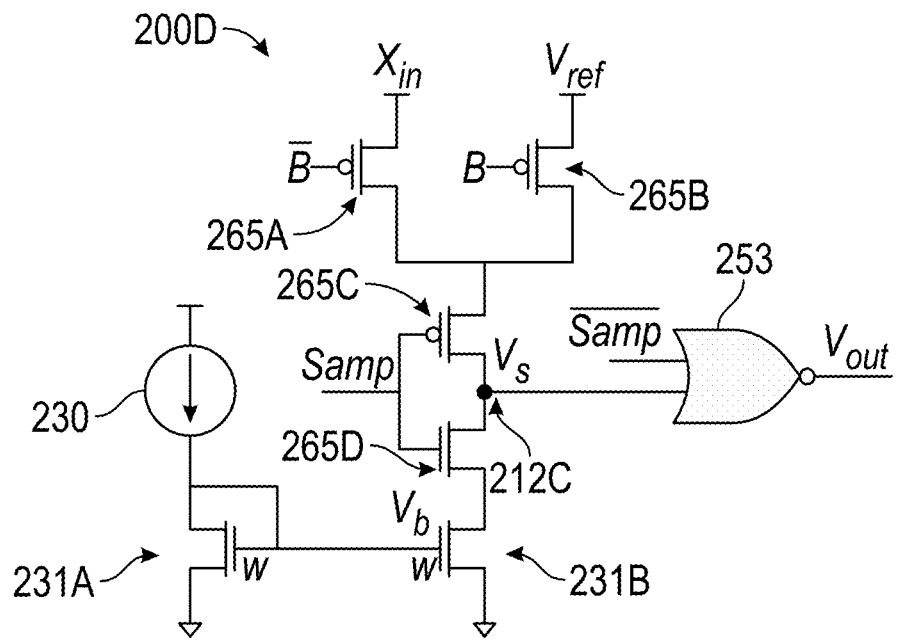
FIG. 10A illustrates another example circuit to multiply an input value by a single-bit binary value in the time domain in accordance with some embodiments.

FIG. 10A illustrates another example circuit 200D to implement multiplication in the time domain in accordance with some embodiments. The circuit 200D comprises a transistor 265A, a transistor 265B, a transistor 265C, a transistor 265D, a transistor 231A, a transistor 231B, a current source 230, and a comparator 253, shown as a NOR gate. (It is to be understood that, as explained earlier, transistors can, in general, be replaced by switches.) The circuit 200D is configured to multiply a first value and a second value, and generate a completion signal indicating completion of the multiplication. The second value comprises a first bit. A first terminal of the transistor 265A is configured to obtain the first value, and a second terminal of the transistor 265A is configured to obtain an inverse of the first bit. Similarly, a first terminal of the transistor 265B is configured to obtain a reference voltage, and a second terminal of the transistor 265B is configured to obtain the first bit. A third terminal of the transistor 265A is coupled to a third terminal of the transistor 265B. A first terminal of the transistor 265C is coupled to the third terminal of the transistor 265A and the third terminal of the transistor 265B. A second terminal of the transistor 265C and a second terminal of the transistor 265D are coupled together and configured to obtain a sampling signal. A third terminal of the transistor 265C is coupled to a first terminal of the transistor 265D and to the input of the comparator 253 (shown as a NOR gate). A third terminal of the transistor 265D is coupled to ground. The enable pin input of the comparator 253 is configured to obtain the inverse of the sampling signal and turn on the comparator 253 when samp=1, and an output of the comparator 253 is configured to provide the completion signal (e.g., to the next circuit in a chain, which may be similar or identical to the circuit 200D).

The circuit 200D can be used, for example, to multiply one bit of a binary (or digital) value, B, by an analog value. The circuit 200D is configured to generate a pulse that has a width proportional to the input, $X_{in}$, multiplied by the value B. The value B may be, for example, a single-bit value stored in an SRAM cell (e.g., the SRAM unit cell 245A shown in FIG. 15). If the value B=1, then during the sampling phase ("samp=0"), the node 212C is charged to a voltage of $V_s=X_{in}$, and if the value B=0, the node 212C is charged to a constant reference voltage, $V_s=V_{ref}$. It is assumed that the value of $X_{in}$ is larger than the value of $V_{ref}$. After the sampling phase ends ("samp=1"), during the multiplication phase ("samp=1"), the node 212C begins to discharge with the mirror of the current source 230 (e.g., via a transistor current source discharge), and when the voltage $V_s$ of the node 212C reaches the threshold of the comparator 253, the output $V_{out}$ of the comparator 253 goes high. It is to be appreciated that the current source 230, the transistor 231A, and the transistor 231B in FIG. 10A are optional and can be eliminated. It is also to be appreciated that the NOR gate illustrated as the comparator 253 can be replaced by another component or components to implement the comparator. For example, the NOR gate can be a dynamic comparator that is enabled when "samp"=1 and has a low output when "samp"=0.

Figures 10B, 10C:
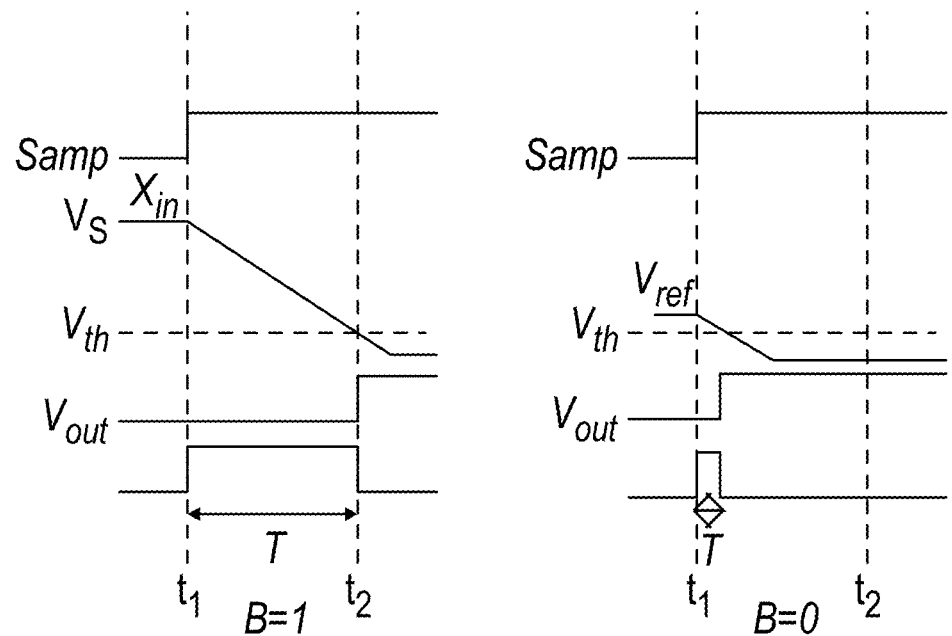
FIGS. 10B and 10C illustrate the operation of the circuit of FIG. 10A in accordance with some embodiments.

FIGS. 10B and 10C illustrate how the output, $V_{out}$, of the comparator 253 in FIG. 10A differs depending on whether the value of B is zero or one. As shown in FIG. 10B, when B=1, the duration T is proportional to $X_{in}$, and, as shown in FIG. 10C, when B=0, the duration T is constant and independent of the value of $X_{in}$. In other words, in response to both of the values B and $X_{in}$ being nonzero, an amount of elapsed time between the trigger signal and the generation of the signal indicating completion of the product is proportional to the first product (multiplication). In contrast, in response to of the values B and $X_{in}$ being zero, an amount of elapsed time between the trigger signal and the generation of the signal indicating completion of the product is a constant amount of time (or duration). The constant duration when B=0, which is shorter than the duration due to the analog input value $X_{in}$ being greater than zero when B=1, is interpreted as an output of zero. (It should be noted that when the analog input value is zero, $X_{in}$ is set to $V_{ref}$, which also results in the output pulse shown in FIG. 10C even if B=1.)

Figure 11A:
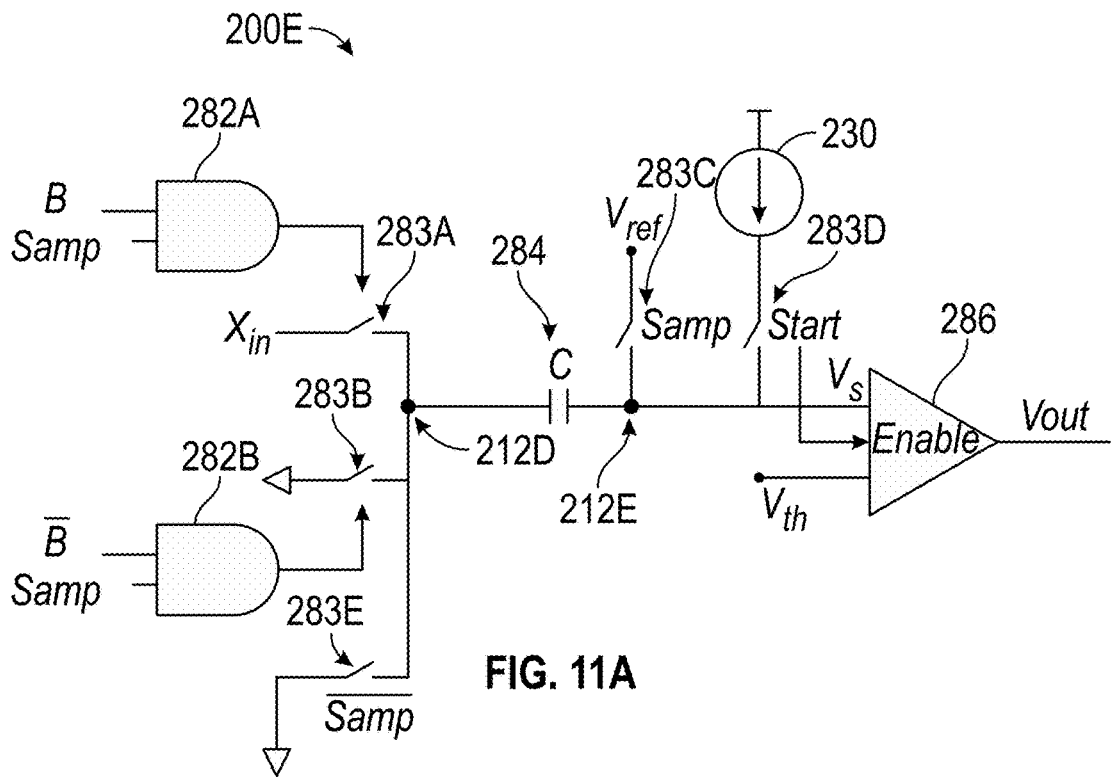
FIG. 11A illustrates another example circuit to multiply an input value by a single-bit binary value in the time domain in accordance with some embodiments.

FIG. 11A illustrates another example circuit 200E to multiply an input value (or signal), $X_{in}$, by a single-bit binary value, B, in the time domain. The circuit 200E includes an AND gate 282A, an AND gate 282B, a switch 283A, a switch 283B, a switch 283C, a switch 283D, a switch 283E, a capacitor 284, a current source 230, and a comparator 286. The AND gate 282A has as inputs the binary value B and the sampling signal "samp." The AND gate 282B has as inputs the inverse of the binary value B ($\overline{B}$), and the sampling signal "samp." During the sampling phase ("samp=1"), the left side of the capacitor 284 is charged to the voltage $X_{in}$ when B=1, and when B=0, the node 212D (on the left side of the capacitor 284) is connected to ground. Also during the sampling phase, the node 212E (on the right side of the capacitor 284) is charged to a reference voltage, $V_s=V_{ref}$. When the sampling signal goes to zero (the sampling phase ends, "samp=0"), the node 212D is connected to ground through the switch 283E, the switch 283C opens, and the node 212E floats. Based on charge conservation energy, the voltage at the node 212E drops to $V_{ref}-X_{in}$. When the signal "start" goes high, the node 212E begins to charge. When the voltage $V_s$ of the node 212E exceeds a threshold voltage, $V_{th}$, the output of the comparator 286 goes high (the comparator 286 flips).

It is to be appreciated that the polarity can be reversed in FIG. 11A so that the capacitor 284 discharges with the current source 230 when "start" goes high rather than charges. In other words, the switch 283B can be connected to $X_{in}$ and the switch 283A can be connected to ground. It is also to be appreciated that the AND gate 282A and the AND gate 282B implement logical "and" functions. Those having ordinary skill in the art will recognize that there are alternative ways to implement a logical "and" function (e.g., using switches, etc.). Those alternative ways are contemplated and are not excluded from the scope of this disclosure.

Figure 11B:
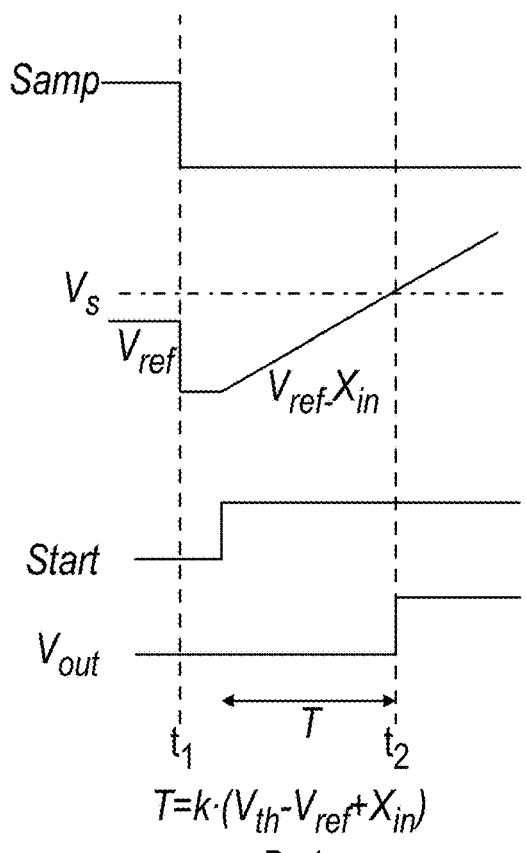
FIGS. 11B and 11C illustrate the operation of the circuit of FIG. 11A.
Figure 11C:
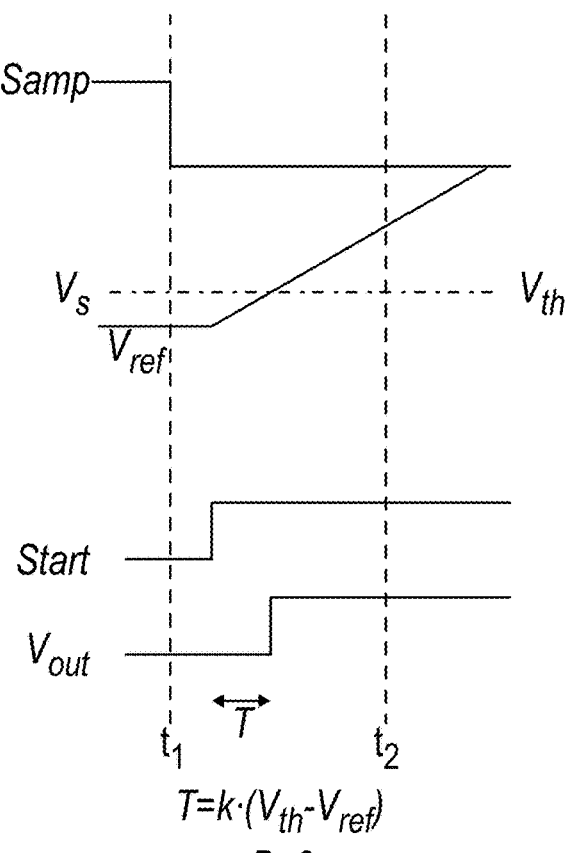

FIGS. 11B and 11C illustrate, respectively, the operation of the circuit 200E when B=1 and B=0. As illustrated by FIG. 11B, when the value of B is 1, the pulse width T is proportional to $X_{in}$. Specifically, $T=k\cdot(V_{th}-V_{ref}+X_{in})$. And, as illustrated by FIG. 11C, when the value of B is 0, the width T is independent of the value of $X_{in}$. Specifically, $T=k\cdot(V_{th}-V_{ref})$, which is a constant width. This constant width is interpreted as the value 0.

Figure 12:
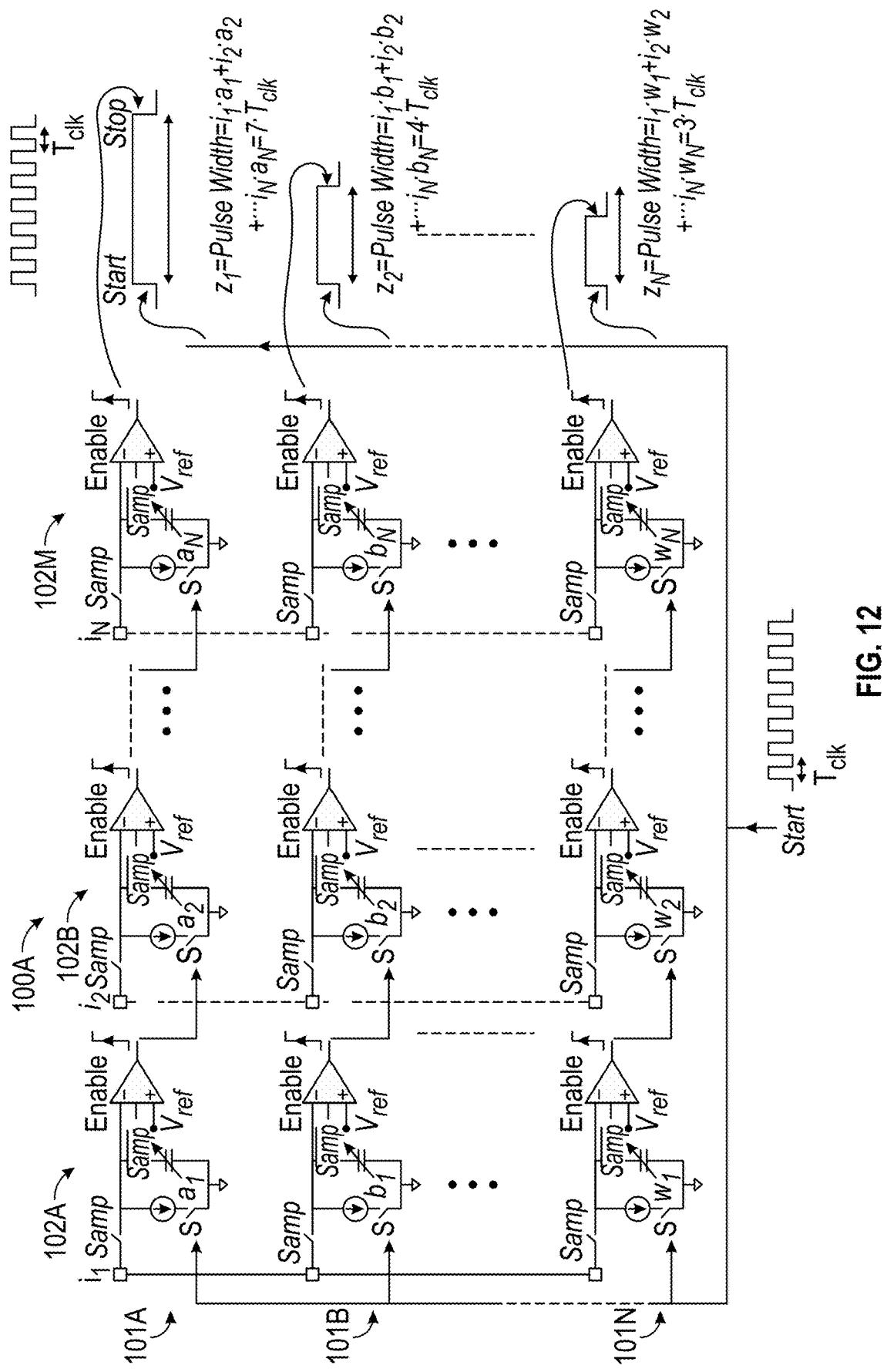
FIG. 12 illustrates the use of an example circuit in cells of an example array in accordance with some embodiments.

FIGS. 8A through 11C illustrate and describe the operation of examples of individual circuits that can be used to generate a pulse width (or measure of time). Multiple instances of these individual circuits, or variations of them, can be incorporated into an array 100 to implement MAC operations. For example, FIG. 12 illustrates how an example circuit similar to the example circuit 200A of FIG. 8A can be used in cells 105 of an example array 100A. Multiple instances of substantially identical circuits can be provided in the array 100A. To allow the weights to vary, the capacitors in FIG. 12 are illustrated as being variable-capacitance capacitors. To improve readability, FIG. 12 illustrates, but does not include reference numerals for, the individual components of the individual circuits. The reference numerals of the components are shown in FIG. 8A, and the discussion above related to FIGS. 8A and 8B describes how the circuits shown in the array 100A of FIG. 12 work.

The example array 100A of FIG. 12 is a rectangular array that includes a plurality of rows 101 and a plurality of columns 102. (The reference numerals 101 and 102 are used generally to refer, respectively, to rows and columns. Particular rows and columns are referred to and labeled as, respectively, 101 followed by a capital letter and 102 followed by a capital letter.) FIG. 12 labels row 101A, row 101B, row 101N, column 102A, column 102B, and column 102M, but it is to be appreciated that the indices N and M do not necessarily indicate that the array 100A has 14 rows and 13 columns. The array 100A can have any number of (one or more) rows 101 and any number of (one or more) columns 102.

As illustrated, each of the input signals $i_1, i_2, \ldots, i_N$ serves as the input to the comparators 208 in a respective column 102. Specifically, the input signal $i_1$ is the input to each of the comparators 208 in column 102A, the input signal $i_2$ is the input to each of the comparators 208 in column 102B, etc. Thus, each of the input signals $i_1, i_2, \ldots, i_N$ is initially stored at the input ($X_{in}$) of each of the comparators 208 in a respective column 102 of the array 100A (e.g., by closing each of the switches 202A in the column 102 and allowing the capacitors 206 to charge). The switches 202A (not labeled in FIG. 12) of the individual cells' circuits, and therefore the preliminary charging of the capacitors 206, can be controlled by a sampling signal, labeled "samp" in FIG. 12.

Each comparator 208 has, in addition to the positive and negative inputs, an "enable" input. In FIG. 12, it is assumed that when the "enable" input signal is 0, the comparator 208 output is reset to zero, and when the "enable" input signal is 1, the comparator 208 is ready for operation. During the sampling phase ("samp"=1), the comparators 208 of the array 100A are reset. It is to be appreciated that the "enable" input can be used to select which of the cells 105 are used for MAC operations. As just one example, the "enable" input can remain 0 for cells 105 not needed or used for a MAC computation.

A synchronous signal controlled by a global clock (e.g., a system clock), labeled "clk" in FIG. 12, can control (e.g., close) the switches 202B in each of the cells 105 in the column 102A of the array 100A to begin discharging the respective capacitors 206 in the column 102A and to begin the MAC operation in each row 101 of the array 100A. (It is to be understood that fewer than all rows 101 can be triggered.) The remainder of the MAC operation(s) in each of the rows 101 can then be completed asynchronously relative to each other, with each subsequent multiplication (dot product) in the next columns 102 triggered by the end of the previous cell's multiplication. In other words, although the MAC operations in all of the rows 101 can be triggered by a clock signal so that they begin at the same time, the MAC operation in each of the rows 101 in use can continue at its own pace, which is determined by the inputs and weights contributing to the MAC operation.

When the multiplication in the cell 105 in column 102A is complete in a particular row 101, the output of the comparator 208 in that cell 105 goes high and starts the discharge of the capacitor 206 in the cell 105 in column 102B of that rows 101 by closing its switch 202B. Once all applicable cells 105 in a row 101 have contributed to the MAC computation, the aggregate pulse width in that row 101 (the accumulation of pulse widths in the columns 102) is the result of the MAC operation for the row 101. As shown in the upper-right portion of FIG. 12, a central clock source can be shared between all the rows 101 for the TDCs 150. The aggregate pulse widths for the individual rows 101 of the array 100A can be measured or quantified using the same central clock.

Accordingly, FIG. 12 is one of several examples of an apparatus or system for performing MAC computations. The system or apparatus comprises a plurality of circuits, including a first circuit and a second circuit (which can be, for example, adjacent to the first circuit). The first circuit is configured to (a) perform a first multiplication in response to a trigger signal, the first multiplication being a product of a first value and a second value, and (b) generate a completion signal, wherein the completion signal indicates completion of the first multiplication. Similarly, the second circuit, which is coupled to the first circuit, is configured to (i) perform a second multiplication in response to the completion signal, the second multiplication being a product of a third value and a fourth value, and (ii) generate an output signal, wherein the output signal indicates completion of the second multiplication. The amount of time that elapses between the trigger signal and the generation of the output signal represents a sum of the first multiplication and the second multiplication. Additional cells 105 can be included in the MAC computation, and each can be triggered by an output from the preceding circuit (e.g., cells 105) and can provide an output.

Although FIG. 12 illustrates a rectangular array, and the explanation assumes that each MAC computation begins in the column 102A, the first cell 105 in a MAC computation need not be in the column 102A. In addition, a MAC computation need not include all of the cells 105 in a particular row 101 (all of the columns 102) of an array 100. Furthermore, as explained above, and the chain of multiplications in a MAC operation need not proceed along a linear path (e.g., within a particular row 101). In general, an array 100 of cells 105 need not have any particular pattern or organizational scheme, and any collection of cells 105 within an array 100 can be used for a MAC computation, as long as the cells 105 have appropriate inputs and outputs (e.g., connections to each other). As an example, in order to compare MAC computation results to each other, or to use different paths or chains of some number N of cells 105 to determine comparable MAC computations (e.g., 6-stage computations), the total "distance" of the computations should be substantially the same. For example, the discussion above of FIG. 5 described a particular path through the array 100 that traversed 6 cells 105. There are many alternative paths that would provide a comparable MAC computation result to the one provided by the path shown and described. For example, the result of a MAC computation performed along the following path could be compared to (has the same path "distance") as the result obtained by the path shown in FIG. 5: starting from the cell 105A, moving to the cell 105 in the row 101B and the column 102A, moving to the cell 105 in the row 101C and the column 102A, moving to the cell 105 in the row 101D and the column 102B, moving to the cell 105K, and ending at the cell 105 in the row 101B and the column 102D.

It is also to be appreciated that the time-to-digital conversion need not follow the completion of each MAC operation. Instead, the result of a completed MAC computation may be saved temporarily (e.g., on a capacitor in the voltage domain). For example, in some applications, the result of one MAC operation may be used as the input for another MAC operation after being stored temporarily (e.g., when training a ML algorithm or adapting a filter).

Figure 13:
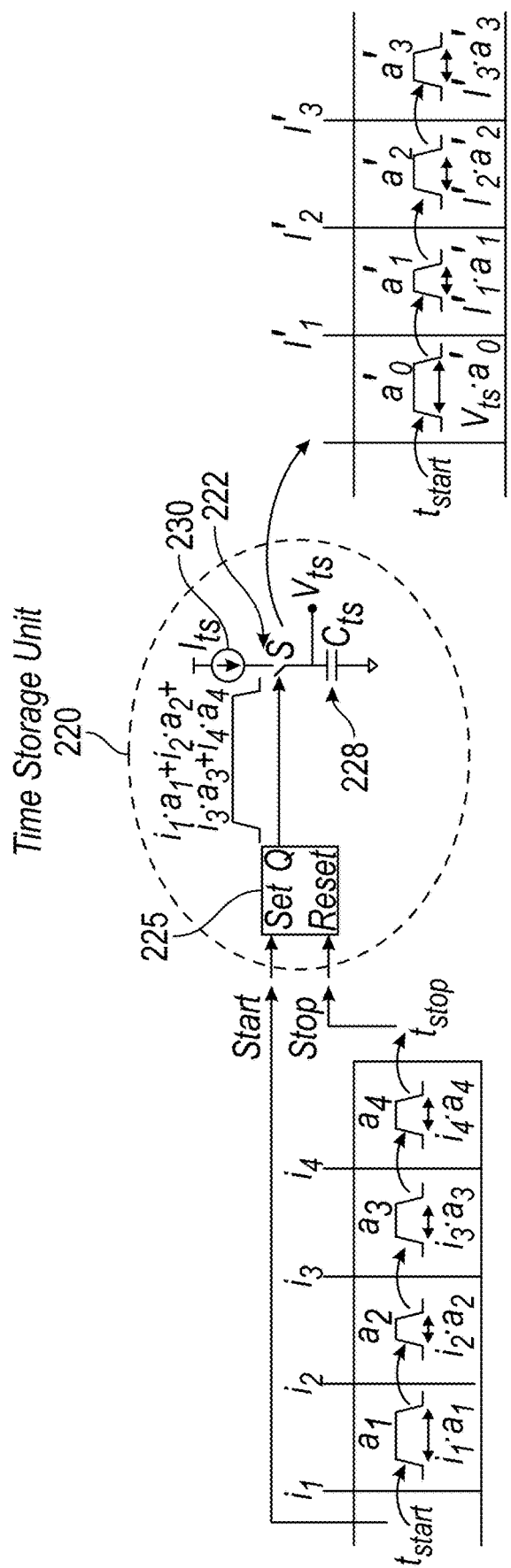
FIG. 13 is an example of a time storage unit that stores the output of a MAC operation in the voltage domain in accordance with some embodiments.

As an example, FIG. 13 illustrates an example time storage unit 220 that stores the output of a MAC operation in the voltage domain in accordance with some embodiments. The configuration of FIG. 13 may be used, for example, in a pipeline architecture to allow an interim calculation result to be stored temporarily. The time storage unit 220 comprises a latch 225 coupled to a switch 222, a time storage capacitor 228 with capacitance $C_{ts}$, and a current source 230. The latch 225 is set when the MAC operation to be stored begins, at the time $t_{start}$, and is reset when the MAC operation to be stored ends, at the time $t_{stop}$. The latch 225 generates a pulse width equal to the result of the completed MAC operation. In the example of FIG. 13, the output of the latch 225 is a pulse with a width equal to $i_1 \cdot a_1 + i_2 \cdot a_2 + i_3 \cdot a_3 + i_4 \cdot a_4$. The output of the latch 225 closes the switch 222. When the switch 222 is closed, the current source 230 generates a current Its that charges the time storage capacitor 228 to a voltage, $V_{ts}$, which is proportional to the result of the completed MAC operation. In the example of FIG. 13, $$V_{ts} = (i_1 \cdot a_1 + i_2 \cdot a_2 + i_3 \cdot a_3 + i_4 \cdot a_4) \cdot \frac{I_{ts}}{C_{ts}}.$$

The voltage $V_{ts}$ can thereafter be used in a number of ways. For example, it can be converted to the digital domain using a conventional ADC. As another example, it can be converted back to the time domain using the capacitance discharge method described above. As yet another example, and as illustrated in the example of FIG. 13, the voltage $V_{ts}$ can be the input to another stage or MAC operation. Thus, the time storage unit 220 provides flexibility to move between the voltage domain and the time domain to achieve desired performance characteristics and/or operation.

Figure 14:
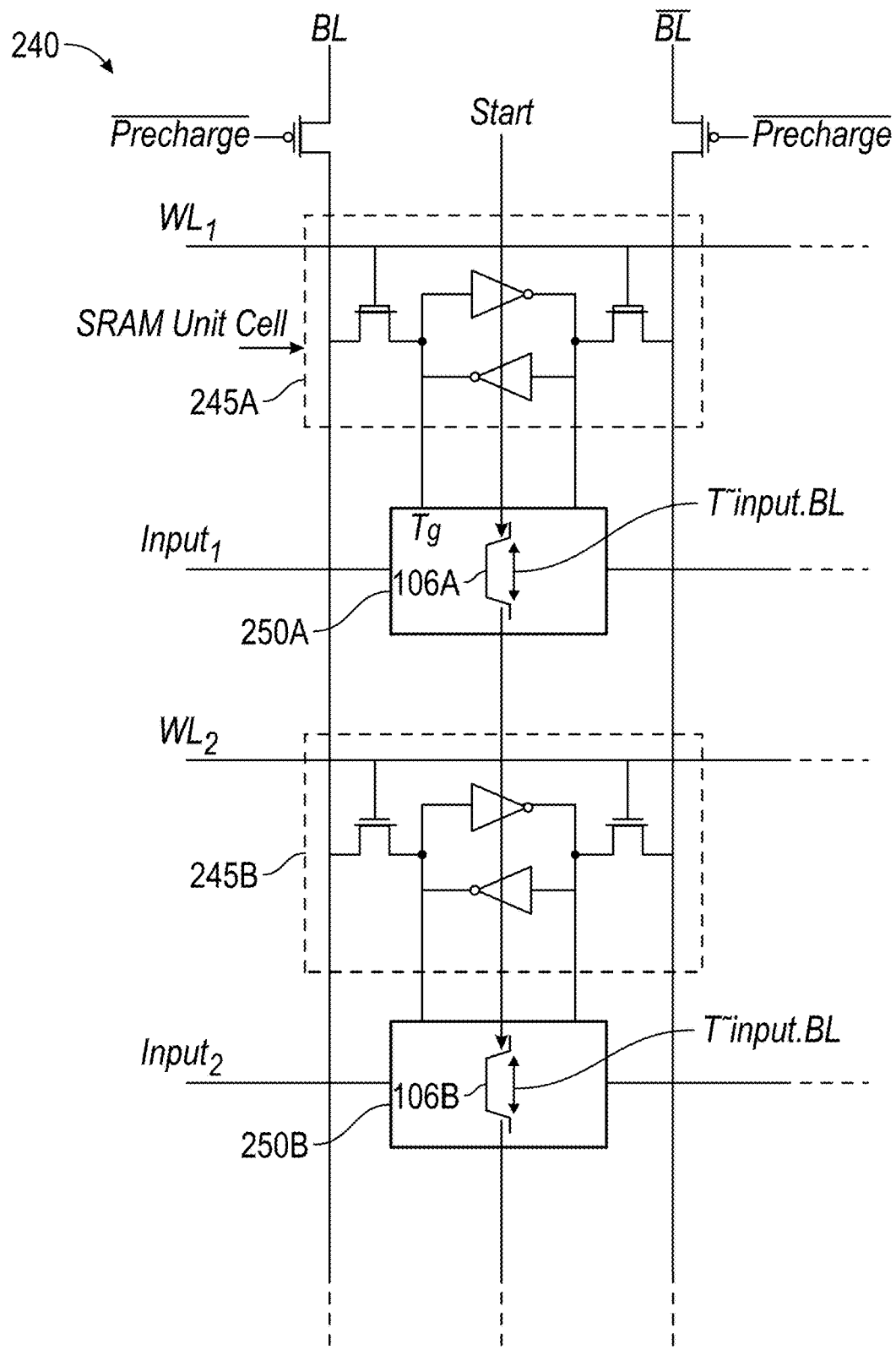
FIG. 14 is an example of how time-based MAC operations can be implemented in an SRAM array in accordance with some embodiments.

In some embodiments, MAC-computation circuitry is embedded in a memory array (e.g., a static random access memory (SRAM)) to allow MAC computations to be performed inside the memory array. FIG. 14 is an example of how time-based MAC operations can be implemented in an SRAM array 240 to embed the computation inside the memory. As illustrated in the example of FIG. 14, which shows two cells of an SRAM array 240, MAC units are added to the SRAM array 240. The MAC unit 250A is coupled to the SRAM unit cell 245A, and the MAC unit 250B is coupled to the SRAM unit cell 245B. The MAC unit 250A and MAC unit 250B may be substantially identical to each other and to other MAC units provided in the memory array. The weights of the multiplications are stored in the SRAM unit cell 245A, SRAM unit cell 245B, etc. The weights are multiplied by respective inputs ("input$_1$," "input$_2$," etc.) to produce a time signal, which can be passed to the next MAC unit in the SRAM array 240.

In the example of FIG. 14, for example, the multiplication for the SRAM unit cell 245A is performed by the MAC unit 250A, which generates a pulse 106A having a width that is proportional to the product of an input value ("input$_1$") and the bit (the weight, or, more generally, data) stored in the SRAM unit cell 245A. (As explained above, it is to be understood that instead of generating a pulse 106A, the MAC unit 250A may generate a pulse width, e.g., using some combination of rising and/or falling edges.) The end of the pulse 106A generated in the MAC unit 250A triggers the multiplication involving the SRAM unit cell 245B. The multiplication for the SRAM unit cell 245B is performed by the MAC unit 250B, which generates a pulse 106B (or pulse width) having a width that is proportional to the product of an input value ("input$_2$") and the bit (the weight, or, more generally, data) stored in the SRAM unit cell 245B. The end of the pulse 106B generated in the MAC unit 250B can then trigger a multiplication for a subsequent SRAM unit cell, etc. The MAC unit 250A and MAC unit 250B can be any of the example circuits discussed herein, or circuits with similar functionality. For example, the MAC unit 250A and MAC unit 250B can be any of the example circuits shown and described in the context of FIGS. 8A through 11C.

At the end of the MAC operation chain, the aggregate pulse width can be converted to the digital domain by a TDC 150, which may be internal to or outside of the SRAM array 240. Similarly, and as explained above in the discussion of FIG. 13, the aggregate pulse width from a MAC computation can be held temporarily by a time storage unit 220, which may be internal to or outside of the SRAM array 240.

The MAC unit 250A and MAC unit 250B illustrated in FIG. 14 can comprise any of the example circuitry shown and described above in the context of, e.g., FIGS. 8A-11C. Other circuits that operate similarly to provide a measure or indication of time corresponding to a product can also be used, and the disclosures herein are not intended to be limited to the example circuits provided and described.

Figure 15:
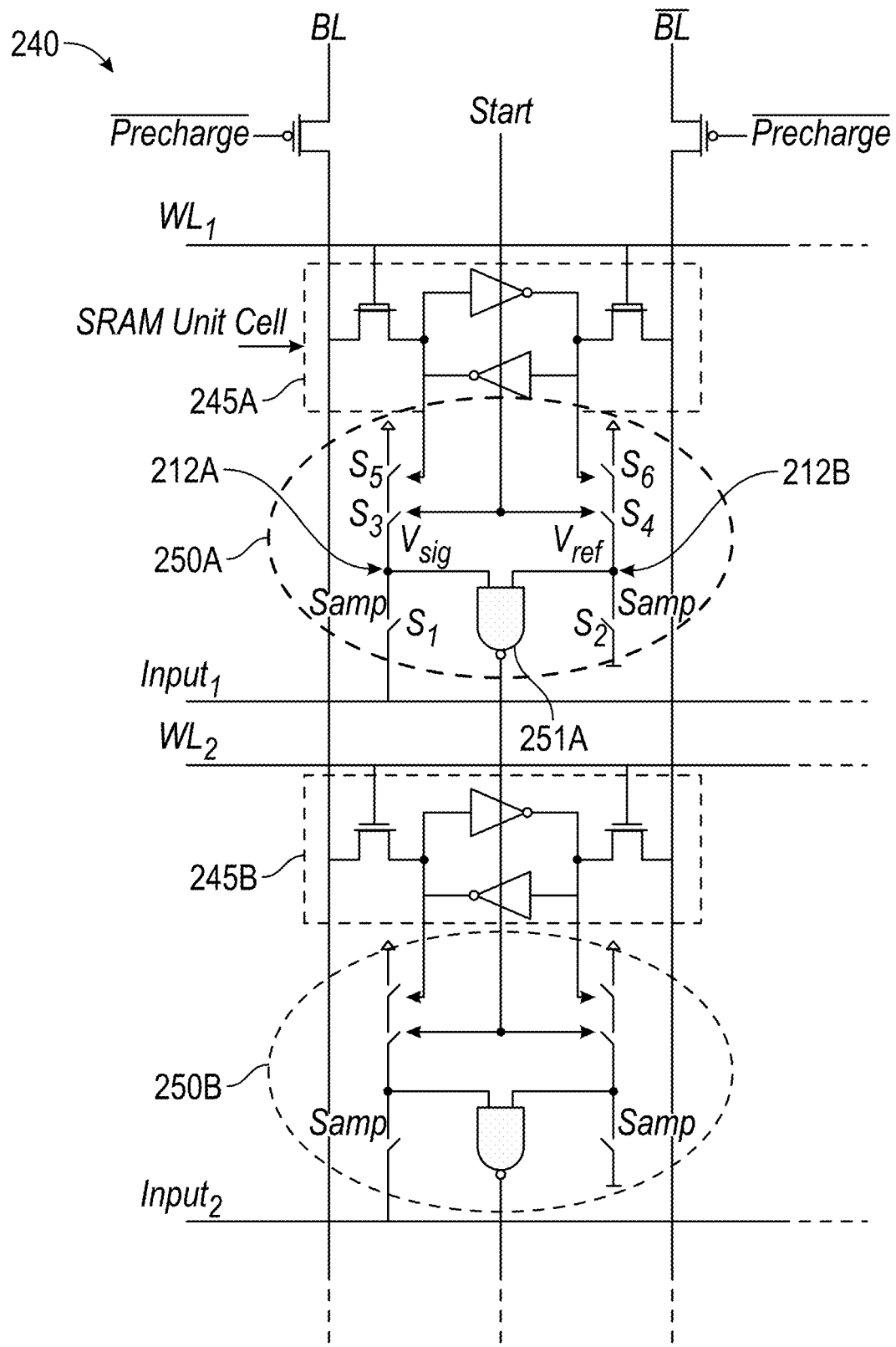
FIG. 15 illustrates how the MAC units of FIG. 14 can be implemented in accordance with some embodiments.

As one example, FIG. 15 illustrates one way the MAC unit 250A and MAC unit 250B of FIG. 14 can be implemented in accordance with some embodiments. As shown in FIG. 15, the MAC unit 250A includes switches $S_1$, $S_2$, $S_3$, $S_4$, $S_5$, and $S_6$, and a NAND logic gate 251A, which acts as the comparator. (The MAC unit 250B is identical to the MAC unit 250A but its components are unlabeled to avoid obscuring the drawing.) The switches $S_1$ and $S_2$ are controlled by a sampling signal, "samp" (e.g., the switches $S_1$ and $S_2$ are closed when samp=1).

As explained further below, a pulse is generated at the output of the NAND logic gate 251A. If the SRAM unit cell 245A holds a zero, the pulse generated by the NAND logic gate 251A has a fixed duration, and if the SRAM unit cell 245A holds a one, the pulse has a duration that is proportional to the input value ("input").

As shown in FIG. 15, the input signal ("input$_1$") for the MAC unit 250A is stored on the node 212A, which is connected to one input of the NAND logic gate 251A through the switch $S_1$. When the switch $S_1$ closes during the sampling phase (samp=1), the node 212A charges to a voltage, $V_{sig}$. A voltage source is connected to the other input of the NAND logic gate 251A through the switch $S_2$. When the switch $S_2$ is closed during the sampling phase (samp=1), the node 212B charges to the reference voltage, $V_{ref}$. Assuming that input$_1$ is above the threshold of the NAND logic gate 251A, the output of the NAND logic gate 251A is enforced to zero when "samp=1."

When the MAC operation begins, if the SRAM unit cell 245A holds a 0 (the weight is zero), the switch $S_6$ is closed, and the switch $S_5$ is open. When the "start" signal goes high, the switch $S_4$ closes and starts discharging $V_{ref}$. When $V_{ref}$ drops below the threshold of the NAND logic gate 251A, the output of the NAND logic gate 251A flips to 1 and triggers the next multiplication operation in the chain (e.g., MAC unit 250B). Therefore, when the weight is zero (SRAM unit cell 245A holds a 0), the MAC unit 250A generates a constant time (e.g., pulse length) that is independent of the input (input$_1$).

In contrast, when the weight is one (SRAM unit cell 245A holds a 1), the switch $S_6$ is off (open), and the switch $S_5$ is on (closed). When the "start" signal goes high, node $V_{sig}$ starts to discharge until $V_{sig}$ drops below the threshold of the NAND logic gate 251A and flips the output of the NAND logic gate 251A to one. Therefore, when weight is one (SRAM unit cell 245A holds a 1), the MAC unit 250A generates a pulse that has a duration proportional to input$_1$.

The pulse generated in the NAND logic gate 251A then triggers the multiplication in the MAC unit 250B (to multiply the input$_2$ by the weight stored in SRAM unit cell 245B), which proceeds as described above for the MAC unit 250A. This process continues until all the multiplication products in a MAC operation chain have been accumulated in the time domain, at which point the aggregated pulse duration can be converted to digital format (e.g., using a TDC 150) or stored, as described previously.

Figure 16A:
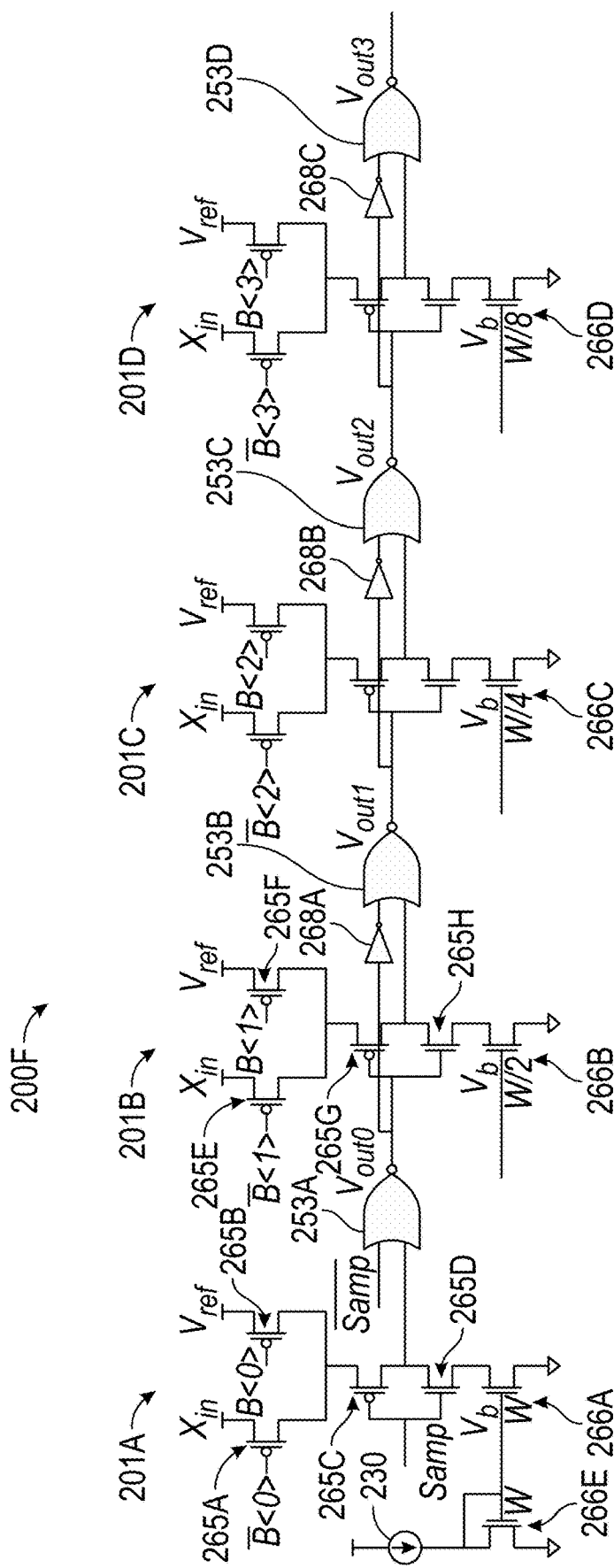
FIG. 16A is an example of how instances of the example circuit of FIG. 10A can be concatenated to implement a 4-bit MAC operation in accordance with some embodiments.

FIG. 16A is an example of how instances of the example circuit 200D from FIG. 10A can be concatenated to implement a 4-bit MAC operation between an input value $X_{in}$ and four bits stored in a memory (e.g., an SRAM), denoted collectively as "B<3:0>" and individually as "B<3>," "B<2>," "B<1>," and "B<0>," where B<0> is the least significant bit. Specifically, the circuit 200F comprises four stages. The stage 201A multiplies B<0> by $X_{in}$, the stage 201B multiples B<1> by $X_{in}$, the stage 201C multiplies B<2> by $X_{in}$, and the stage 201D multiplies B<3> by $X_{in}$. The stage 201A, the stage 201B, the stage 201C, and the stage 201D have the configurations and connections illustrated in FIG. 16A.

The stage 201A includes a transistor 265A, a transistor 265B, a transistor 265C, a transistor 265D, a transistor 266A, a transistor 266E, a current source 230, and a comparator 253A (illustrated as a NOR gate). (It is to be understood that, as explained earlier, transistors can, in general, be replaced by switches.) A first terminal of the transistor 265A is configured to obtain $X_{in}$, and a second terminal of the transistor 265A is configured to obtain an inverse of the bit B<0>. Similarly, a first terminal of the transistor 265B is configured to obtain a reference voltage, and a second terminal of the transistor 265B is configured to obtain B<0>. A third terminal of the transistor 265A is coupled to a third terminal of the transistor 265B. A first terminal of the transistor 265C is coupled to the third terminal of the transistor 265A and the third terminal of the transistor 265B. A second terminal of the transistor 265C and a second terminal of the transistor 265D are coupled together and configured to obtain an inverse of a sampling signal. A third terminal of the transistor 265C is coupled to a first terminal of the transistor 265D and to the input of the comparator 253A (shown as a NOR gate). A third terminal of the transistor 265D is coupled to a first terminal of the transistor 266A. The current source 230 is coupled to first and second terminals of the transistor 266E A third terminal of the transistor 266E is coupled to ground. A second terminal of the transistor 266A is coupled to the second terminal of the transistor 266E and to the current source 230. The enable pin input of the comparator 253A is configured to obtain the sampling signal and turns on the comparator 253A when "samp=1," and an output of the comparator 253A is configured to provide the completion signal to the stage 201B.

The stage 201B includes a transistor 265E, a transistor 265F, a transistor 265G, a transistor 265H, a transistor 266B, an inverter 268A, and a comparator 253B (illustrated as a NOR gate). A first terminal of the transistor 265E is configured to obtain $X_{in}$, and a second terminal of the transistor 265E is configured to obtain an inverse of the bit B<1>. Similarly, a first terminal of the transistor 265F is configured to obtain a reference voltage, and a second terminal of the transistor 265F is configured to obtain B<1>. A third terminal of the transistor 265E is coupled to a third terminal of the transistor 265F. A first terminal of the transistor 265G is coupled to the third terminal of the transistor 265E and the third terminal of the transistor 265F. A second terminal of the transistor 265G and a second terminal of the transistor 265H are coupled together and configured to obtain the completion signal from the output of the stage 201A. A third terminal of the transistor 265G is coupled to a first terminal of the transistor 265H and to the input of the comparator 253B (shown as a NOR gate). A third terminal of the transistor 265H is coupled to a first terminal of the transistor 266B, which has a width that is substantially half of the width of the transistor 266A. The enable pin input of the comparator 253B is configured to obtain the inverse of the stage 201A output signal from the inverter 268A, and an output of the comparator 253B is configured to provide its completion signal to the stage 201C. The other two stages, the stage 201C and the stage 201D include similar or identical components, as illustrated.

The four stages of the example circuit 200F are similar, but not identical. One difference is that the current of each stage differs. Specifically, the transistor 266A at the input of stage 201A has a width of W, the transistor 266B at the input of stage 201B has a width of W/2 and, thus, half of the current of the transistor 266A, the transistor 266C at the input of stage 201C has a width of W/4 and, thus, half of the current of the transistor 266B, and the transistor 266D at the input of stage 201D has a width of W/8 and, thus, half of the current of the transistor 266C. Another difference is that the comparator 253A of stage 201A (the first stage in the MAC computation) is enabled by the inverse of the "samp" signal, whereas that corresponding input to the NOR gates in each of the stage 201B, stage 201C, and stage 201D is an inverted output of the prior stage (e.g., that input to the comparator 253B (shown as a NOR gate) in stage 201B is $V_{out0}$ inverted by the inverter 268A; in stage 201C, that input to the comparator 253C (shown as a NOR gate) is $V_{out1}$ inverted by the inverter 268B; and in stage 201D, that input to the comparator 253D (shown as a NOR gate) is $V_{out2}$ inverted by the inverter 268C). Thus, the sampling signal triggers the operation of the stage 201A, the output of the stage 201A, $V_{out0}$, triggers the operation of the stage 201B, the output of the stage 201B, $V_{out1}$, triggers the operation of the stage 201C, and the output of the stage 201C, $V_{out2}$, triggers the operation of the stage 201D. As a result, the individual multiplications at each of the stages are accumulated.

Each stage of the circuit 200F generates a pulse width that is proportional to the product of the B value of that stage and $X_{in}$. Because the significance (weight) of the individual bits "B<3>," "B<2>," "B<1>," and "B<0>" differs, the discharge slope is different for each bit to account for its position (significance) in the four-bit number. Specifically, the discharge current is distributed as I, I/2, I/4 and I/8 to correspond to the significance of the bits B<0>, B<1>, B<2> and B<3>.

Thus, FIG. 16A is an example of an apparatus the includes a first circuit (e.g., stage 201A) coupled to a second circuit (e.g., stage 201B). Each stage of the circuit 200F is configured to multiply a single-bit value (e.g., one bit of the multi-bit digital value B) by an input value $X_{in}$. Each stage comprises a comparator (e.g., a NOR gate), first, second, third and fourth transistors (e.g., CMOS transistors), and an inverter configured as shown in FIG. 16A. The apparatus can also include a current source 230 and additional transistors to provide a current mirror as described herein. As explained above, the comparator 253A, comparator 253B, comparator 253C, and/or comparator 253D, which are illustrated as NOR gates, can be replaced by another component or combination of components to implement the comparator.

Figure 16B:
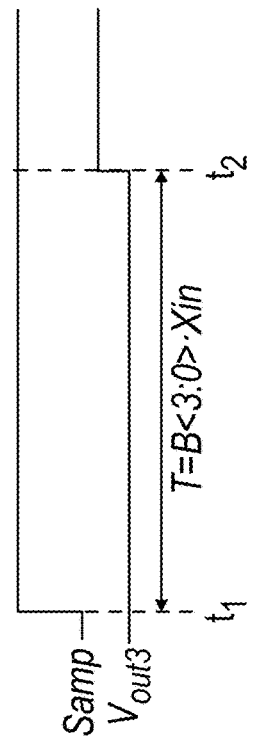
FIG. 16B illustrates the operation of the circuit of FIG. 16A.

As illustrated in FIG. 16B, the time interval between the rising edge of the "samp" signal edge and when the output of the stage 201D, $V_{out3}$, goes high represents the product of the decimal value of B<3:0> and $X_{in}$. (It is to be appreciated that, as explained previously, the falling edge of the "samp" signal could be used instead. Those having ordinary skill in the art will understand how to adjust the components of FIG. 16A accordingly.) Specifically, the product $X_{in}$·B<3:0> is equal to $X_{in}$·B<0>+2$X_{in}$·B<1>+4$X_{in}$·B<2>+8$X_{in}$·B<3>.

Figure 17A:
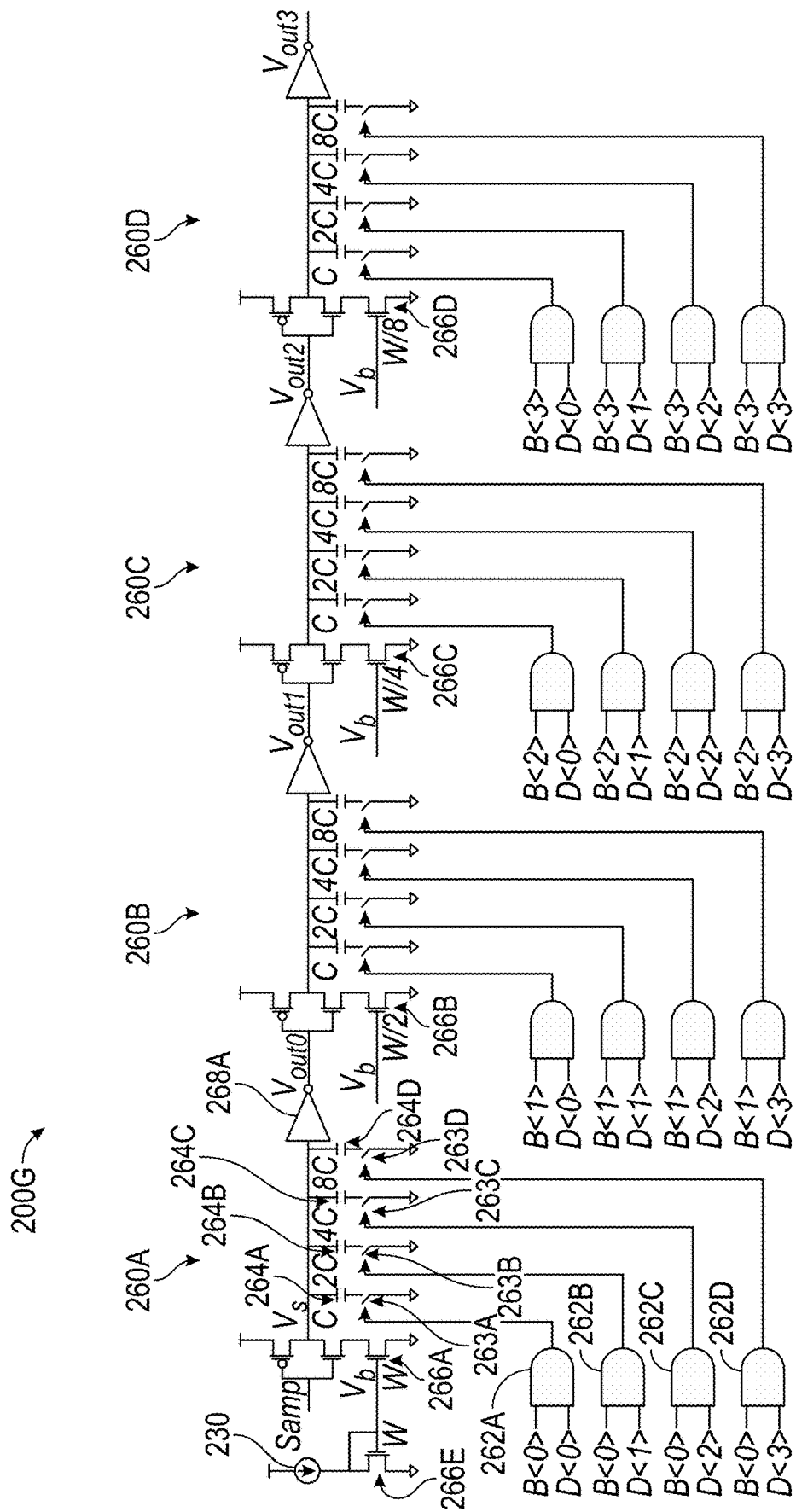
FIG. 17A illustrates an example circuit to multiply two, 4-bit digital numbers in accordance with some embodiments.

FIG. 17A illustrates an example circuit 200G to multiply two, 4-bit digital numbers in accordance with some embodiments. The two digital numbers the circuit 200G is configured to multiply are denoted as "D<3:0>" and "B<3:0>," where D<3> and B<3> are the most significant bits. The individual bits of D<3:0> and B<3:0> are denoted, respectively, as "D<3>," "D<2>," "D<1>," and "D<0>," and "B<3>," "B<2>," "B<1>," and "B<0>." The circuit 200G has four stages: the stage 260A, the stage 260B, the stage 260C, and the stage 260D. The stage 260A is configured to multiply B<0> by D<3:0>, the stage 260B is configured to multiply B<1> by D<3:0>, the stage 260C is configured to multiply B<2> by D<3:0>, and the stage 260D is configured to multiply B<3> by D<3:0>. Thus, each stage is associated with a B value.

As illustrated in FIG. 17A each of the stages comprises various electronic components, including, but not limited to, transistors, AND gates, capacitors, switches, and an inverter. One input to each of the AND gates of a stage is the B value associated with that stage. The other input of an AND gate is one of the bits of D. The current of each stage differs depending on the significance of the bit (B value) associated with that stage.

Some of the individual components of the stage 260A are labeled in FIG. 17A, including a transistor 266A, four AND gates (e.g., the AND gate 262A, the AND gate 262B, the AND gate 262C, and the AND gate 262D), four switches (e.g., switch 263A, switch 263B, switch 263C, and switch 263D), four capacitors (e.g., the capacitor 264A, the capacitor 264B, the capacitor 264C, and the capacitor 264D), and a comparator 269A (shown as an inverter). The B value associated with the stage 260A is B<0>; thus, B<0> is one input of each of the AND gate 262A, AND gate 262B, AND gate 262C, AND gate 262D. The other input to the AND gate 262A is D<0>, the other input to the AND gate 262B is D<1>, the other input to the AND gate 262C is D<2>, and the other input to the AND gate 262D is D<3>. The AND gate 262A is coupled to the capacitor 264A by the switch 263A. The capacitance of the capacitor 264A is C. The AND gate 262B is coupled to the capacitor 264B by a switch 263B. The capacitance of the capacitor 264B is 2C. The AND gate 262C is coupled to the capacitor 264C by a switch 263C. The capacitance of the capacitor 264C is 4C. Finally, the AND gate 262D is coupled to the capacitor 264D by a switch 263D. The capacitance of the capacitor 264D is 8C.

The configurations of the stage 260B, stage 260C, and stage 260D are similar to the configuration of the stage 260A, except that, as shown in FIG. 16A, to account for the difference in significance of each B value, the current of each stage differs, the result of which is that the delay of the inverter of each stage is inversely proportional to the current. Specifically, the transistor 266A at the input of stage 260A has a width of W, the transistor 266B at the input of stage 260B has a width of W/2 and, as a result, half of the current of the transistor 266A, the transistor 266C at the input of stage 260C has a width of W/4 and, thus, half of the current of the transistor 266B, and the transistor 266D at the input of stage 260D has a width of W/8 and, therefore, half of the current of the transistor 266C. Consequently, the discharge current is distributed as I, I/2, I/4 and I/8 to correspond, respectively, to the weights of the bits B<0>, B<1>, B<2> and B<3>. The output of an earlier stage triggers the operation of the subsequent stage (e.g., the output of stage 260A triggers the operation of stage 260B, the output of 260B triggers the operation of stage 260C, etc.) and the accumulation (adding up) of the individual products determined by each stage. Assuming the rising edge of the sampling signal "samp" is used to trigger the operation of the first stage (e.g., stage 260A in FIG. 17A), the time interval between the rising edge of the "samp" signal and when the output of the stage 260D, $V_{out3}$, goes high represents the product of the decimal value of D<3:0> and B<3:0>. (It is to be appreciated that, as explained previously, the falling edge of the "samp" signal could be used instead. Those having ordinary skill in the art will understand how to adjust the components of FIG. 17A accordingly.) As will be appreciated, the overall product calculated by the circuit 200G D<3:0>· B<3:0> is equal to D<3:0>· B<0>+2D<3:0>·B<1>+4D<3:0>·B<2>+8D<3:0>· B<3>.

Figure 17B:
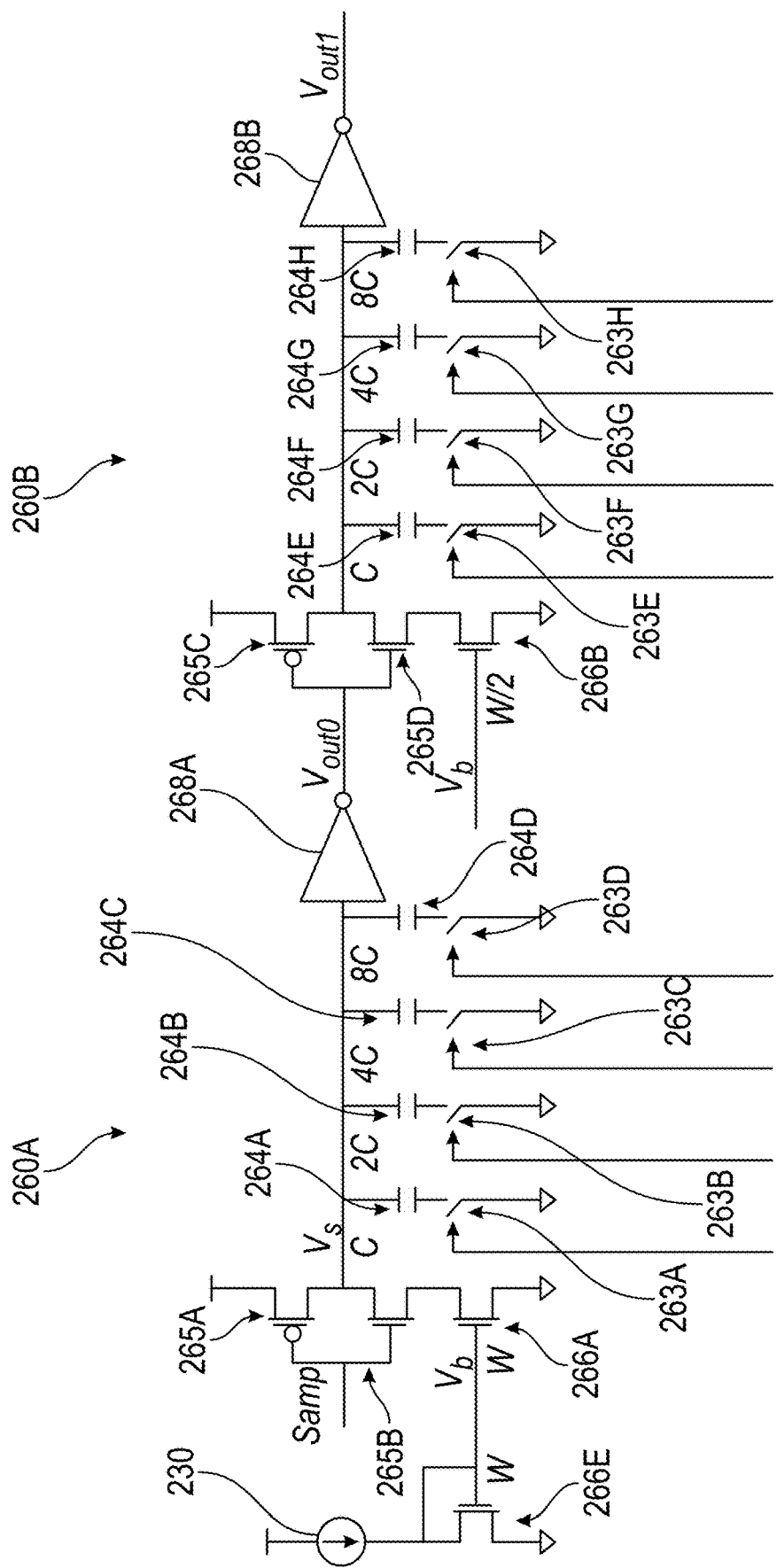
FIG. 17B is a closer view of a portion of FIG. 17A in accordance with some embodiments.

FIG. 17B is a closer view of the stage 260A and the stage 260B from FIG. 17A. The stage 260A includes a capacitor 264A, which has a first capacitance (denoted as C), a capacitor 264B, which has a second capacitance, which is intended to be half of the first capacitance (but may not be exactly half because of manufacturing tolerances and imperfections), a capacitor 264C, which has a third capacitance, which is intended to be half of the second capacitance (but may not be exactly half), a capacitor 264D, which has a fourth capacitance, which is intended to be half of the third capacitance (but may not be exactly half). The stage 260A also includes a switch 263A, a switch 263B, a switch 263C, and a switch 263D, a transistor 265A, a transistor 265B, a transistor 266A, a transistor 266E, a current source 230, and a comparator 269A (shown as an inverter). The switch 263A is coupled to a first terminal of the capacitor 264A and is configured to be closed in response to both B<0> and D<0> being equal to 1 and open otherwise. A second terminal of the capacitor 264A is coupled to the transistor 265A, the transistor 265B, and the comparator 269A. The switch 263B is coupled to a first terminal of the capacitor 264B and is configured to be closed in response to both B<0> and D<1> being equal to 1 and open otherwise. A second terminal of the capacitor 264B is coupled to the transistor 265A, the transistor 265B, and the comparator 269A. The switch 263C is coupled to a first terminal of the capacitor 264C and is configured to be closed in response to both B<0> and D<2> being equal to 1 and open otherwise. A second terminal of the capacitor 264C is coupled to the transistor 265A, the transistor 265B, and the comparator 269A. The switch 263D is coupled to a first terminal of the capacitor 264D and is configured to be closed in response to both B<0> and D<3> being equal to 1 and open otherwise. A second terminal of the capacitor 264D is coupled to the transistor 265A, the transistor 265B, and the comparator 269A. The output of the comparator 269A is configured to provide the completion signal to the stage 260B.

The stage 260B includes a capacitor 264E, which has the first capacitance (denoted as C), a capacitor 264F, which has a second capacitance, which is intended to be half of the first capacitance (but may not be exactly half because of manufacturing tolerances and imperfections), a capacitor 264G, which has a third capacitance, which is intended to be half of the second capacitance (but may not be exactly half), a capacitor 264H, which has a fourth capacitance, which is intended to be half of the third capacitance (but may not be exactly half). In other words, the values of the capacitances in the stage 260B are intended to be the same as the capacitances in the stage 260A. The stage 260B also includes a switch 263E, a switch 263F, a switch 263G, and a switch 263H, a transistor 265C, a transistor 265D, a transistor 266B, and a comparator 269B (shown as an inverter). The switch 263E is coupled to a first terminal of the capacitor 264E and is configured to be closed in response to both B<1> and D<0> being equal to 1 and open otherwise. A second terminal of the capacitor 264E is coupled to the transistor 265C, the transistor 265D, and the comparator 269B. The switch 263F is coupled to a first terminal of the capacitor 264F and is configured to be closed in response to both B<1> and D<1> being equal to 1 and open otherwise. A second terminal of the capacitor 264F is coupled to the transistor 265C, the transistor 265D, and the comparator 269B. The switch 263G is coupled to a first terminal of the capacitor 264G and is configured to be closed in response to both B<1> and D<2> being equal to 1 and open otherwise.

A second terminal of the capacitor 264G is coupled to the transistor 265C, the transistor 265D, and the comparator 269B. The switch 263H is coupled to a first terminal of the capacitor 264H and is configured to be closed in response to both B<1> and D<3> being equal to 1 and open otherwise. A second terminal of the capacitor 264H is coupled to the transistor 265C, the transistor 265D, and the comparator 269B. The output of the comparator 269B is configured to provide the completion signal to the stage 260C.

Thus, the example circuit of FIGS. 17A and 17B is an example of an apparatus that can multiply two digital values. Each stage shown in FIG. 17A multiplies one bit of one digital value by all of the bits of the other digital value. Although FIG. 17A illustrates the multiplication of two 4-bit values, it will be apparent to those having ordinary skill in the art how FIG. 17A (and FIG. 17B) can be modified to multiply values that have other numbers of bits (e.g., to multiply a 2-bit value by a 4-bit value, a 3-bit value by a 2-bit value, a 4-bit value by an 8-bit value, an 8-bit value by an 8-bit value, an 8-bit value by a 16-bit value, a 32-bit value by a 32-bit value, etc.).

It is to be appreciated that other circuitry can be used in addition or alternatively to achieve the same or equivalent function as FIGS. 17A and 17B. The example circuitry illustrated in FIGS. 17A and 17B is not intended to be limiting. For example, although FIG. 17A illustrates AND gates controlling the switches (e.g., gate 262A controlling switch 263A), there are other ways to implement switch control. For example, any component or combination of components that performs a logical AND function could be used.

As explained previously, although certain portions of this document refer to generating pulses having some width or duration, that description is primarily for convenience of explanation. It will be appreciated in light of the disclosures herein that the objective is to obtain an indication of time corresponding (proportional) to a product of two numbers (e.g., an input and a weight). Thus, as explained previously, the indication of time can be represented by an amount of time elapsing between a triggering edge (which may be a rising or falling edge) and an ending edge (which may be a rising or falling edge). Specifically, it is not necessary for an implementation to generate a physical pulse having a width that is the same as the indication of time.

As will be appreciated by those having ordinary skill in the art, the example circuits shown and described herein can be modified in various ways without departing from the scope and spirit of the disclosure. For example, and as indicated above, embodiments that use one or more capacitors can be configured either to charge or discharge the one or more capacitors during the multiplication phase. Similar modifications will be apparent to those having ordinary skill in the art in light of the disclosures herein.

It is to be appreciated that, generally speaking, the values that can be multiplied in accordance with the disclosures herein can be analog, digital, or binary. A single circuit can multiply a value by itself. Different stages of a chain can take, as input, the same value (e.g., a bit of a value). It is also to be appreciated that an apparatus that includes multiple stages (e.g., a first circuit coupled to a second circuit, wherein the output of the first circuit (indicating completion of a first multiplication) triggers the multiplication operation of the second circuit) can multiply a variety of values. In some embodiments, a first stage (circuit) multiplies a first value and a second value, and a second stage (circuit) multiplies a third value and a fourth value. In some embodiments, at least two of the first value, the second value, the third value, and the fourth value are the same value. In some embodiments, all of the first value, the second value, the third value, and the fourth value are different values. In some embodiments, at least two of the first value, the second value, the third value, and the fourth value are equal (though possibly from different sources, such as storage locations). In some embodiments, at least two of the first value, the second value, the third value, and the fourth value are unequal. In some embodiments, at least one of the first value, second value, third value, or fourth value is a binary value. In some embodiments, at least one of the first value, second value, third value, or fourth value is a single-bit value. In some embodiments, at least one of the first value, second value, third value, or fourth value is a digital value. In some embodiments, at least one of the first value, second value, third value, or fourth value is an analog value.

It is to be appreciated that, generally speaking, all of the various disclosed embodiments can be used to perform MAC computations. For example, each of circuit 200A, circuit 200B, circuit 200C, circuit 200D, and circuit 200E can be used to implement stages of a MAC computation. FIGS. 16A, 17A, and 17B show example embodiments that include multiple stages (e.g., in FIG. 16A, stage 201A, stage 201B, stage 201C, and 201D, and in FIG. 17A, stage 260A, stage 260B, stage 260C, and stage 260D) using particular circuits for the stages of MAC computations. These are merely examples. Each of circuit 200A, circuit 200B, circuit 200C, circuit 200D, and circuit 200E, and circuits that perform similarly or identically, can be situated similarly in stages. Thus, all of the disclosed embodiments of circuits and stages, and equivalents thereof, can be used to (1) perform a multiplication operation, and (2) generate a signal that indicates completion of the multiplication operation. Moreover, all of the disclosed embodiments of circuits and stages can be used as a first circuit configured to (a) perform a first multiplication in response to a trigger signal, the first multiplication being a product of a first value and a second value, and (b) generate a completion signal, wherein the completion signal indicates completion of the first multiplication. Similarly, all of the disclosed embodiments of circuits and stages can be used as a second circuit coupled to the first circuit and configured to (i) perform a second multiplication in response to the completion signal, the second multiplication being a product of a third value and a fourth value, and (ii) generate an output signal, wherein the output signal indicates completion of the second multiplication, and wherein an amount of elapsed time between the trigger signal and the generation of the output signal represents a sum of the first multiplication and the second multiplication.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As will be appreciated by those having ordinary skill in the art, component characteristics can vary somewhat because of manufacturing imperfections and tolerances. Accordingly, a first transistor having "substantially half" of the width of a second transistor means that the width is half for all practical purposes (e.g., despite manufacturing tolerances/imperfections). Likewise, a first capacitor having "substantially half" of the capacitance of a second capacitor means that the capacitance is half for all practical purposes (e.g., despite manufacturing tolerances/imperfections).

As used herein, the term "binary" refers to a value that can have one of two values (typically 0 or 1). The term "digital" as used herein refers to a value that is represented by a set of one or more binary values (e.g., bits). Accordingly, a binary value is a digital value, but a digital value is not necessarily a binary value (though it may have binary digits).

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. An apparatus for performing time-domain multiply-and-accumulate (MAC) computations, the apparatus comprising:
a first circuit configured to (a) perform a first multiplication in response to a trigger signal provided to an input line of the first circuit, the first multiplication being a product of a first value and a second value, and (b) generate a completion signal, wherein the completion signal indicates completion of the first multiplication; and
a second circuit coupled to the first circuit and configured to (i) perform a second multiplication in response to the completion signal, the second multiplication being a product of a third value and a fourth value, and (ii) generate an output signal, wherein the output signal indicates completion of the second multiplication and is provided via an output line of the second circuit,
wherein an amount of elapsed time between the trigger signal and the generation of the output signal represents a sum of the first multiplication and the second multiplication.

2. The apparatus recited in claim 1, wherein:
in response to the first value being nonzero and the second value being nonzero, an amount of elapsed time between the trigger signal and the generation of the completion signal is proportional to the first multiplication, and/or
in response to at least one of the first value or the second value being zero, the amount of elapsed time between the trigger signal and the generation of the completion signal is a constant amount of time.

3. The apparatus recited in claim 1, wherein:
the first circuit is configured to generate a first pulse having a duration proportional to an amount of time between the trigger signal and the completion signal, and
the second circuit is configured to generate a second pulse having a duration proportional to an amount of time between the completion signal and the output signal.

4. The apparatus recited in claim 1, wherein:
the first value is an input to the first circuit,
the second value is stored by a component of the first circuit,
the third value is an input to the second circuit, and
the fourth value is stored by a component of the second circuit.

5. The apparatus recited in claim 1, wherein:
the first value is stored by a first component of the first circuit,
the second value is stored by a second component of the first circuit,
the third value is stored by a first component of the second circuit, and
the fourth value is stored by a second component of the second circuit.

6. The apparatus recited in claim 5, wherein at least one of the first component of the first circuit, the second component of the first circuit, the first component of the second circuit, or the second component of the second circuit is a capacitor or a memory cell.

7. The apparatus recited in claim 1, further comprising a time-to-digital converter (TDC) coupled to the input line of the first circuit and the output line of the second circuit and configured to digitize the amount of elapsed time between the trigger signal and the generation of the output signal.

8. The apparatus recited in claim 1, further comprising a time storage unit coupled to the input line of the first circuit and the output line of the second circuit and configured to store the amount of elapsed time between the trigger signal and the generation of the output signal as a voltage.

9. The apparatus recited in claim 1, wherein the first circuit comprises:
   a capacitor;
   a first switch;
   a second switch;
   a current source;
   a switch controller configured to control the first switch; and
   a comparator,
wherein:
   the first switch is coupled to a first terminal of the capacitor and configured to provide the first value to the capacitor during a sampling phase,
   a first terminal of the current source is coupled to the first terminal of the capacitor,
   a second terminal of the current source is coupled to the second switch,
   the second switch is coupled to a second terminal of the capacitor and is configured to close to allow a charge on the capacitor to vary during a multiplication phase,
   a first input of the comparator is coupled to the first terminal of the capacitor,
   a second input of the comparator is coupled to a reference voltage, and
   an output of the comparator is configured to provide the completion signal to the second circuit.

10. The apparatus recited in claim 1, wherein the second value comprises a first bit, and wherein the first circuit comprises:
    a first switch;
    a second switch;
    a third switch;
    a fourth switch; and
    a first comparator,
wherein:
    a first terminal of the first switch is configured to obtain the first value,
    a second terminal of the first switch is configured to obtain an inverse of the first bit,
    a first terminal of the second switch is configured to obtain a reference voltage,
    a second terminal of the second switch is configured to obtain the first bit,
    a third terminal of the first switch is coupled to a third terminal of the second switch,
    a first terminal of the third switch is coupled to the third terminal of the first switch and the third terminal of the second switch,
    a second terminal of the third switch and a second terminal of the fourth switch are coupled together and configured to obtain a sampling signal,
    a third terminal of the third switch is coupled to a first terminal of the fourth switch and to a first input of the first comparator,
    a third terminal of the fourth switch is coupled to ground,
    a second input of the first comparator is configured to obtain an inverse of the sampling signal to enable the first comparator, and
    an output of the first comparator is configured to provide the completion signal to the second circuit.

11. The apparatus recited in claim 10, further comprising:
    a current source;
    a first transistor; and
    a second transistor,
wherein:
    the current source is coupled to a first terminal of the first transistor and to a second terminal of the first transistor,
    a first terminal of the second transistor is coupled to the third terminal of the fourth switch,
    the second terminal of the first transistor is coupled to a second terminal of the second transistor,
    a third terminal of the first transistor is coupled to ground, and
    a third terminal of the second transistor is coupled to ground.

12. The apparatus recited in claim 11, wherein the second value comprises a second bit, wherein the second bit is a next-most-significant bit relative to the first bit, and wherein the second circuit comprises:
    a fifth switch;
    a sixth switch;
    a seventh switch;
    an eighth switch;
    an third transistor;
    an inverter; and
    a second comparator,
wherein:
    a first terminal of the fifth switch is configured to obtain the first value,
    a second terminal of the fifth switch is configured to obtain an inverse of the second bit,
    a first terminal of the sixth switch is configured to obtain the reference voltage,
    a second terminal of the sixth switch is configured to obtain the second bit,
    a third terminal of the fifth switch is coupled to a third terminal of the sixth switch,
    a first terminal of the seventh switch is coupled to the third terminal of the fifth switch and the third terminal of the sixth switch,
    a second terminal of the seventh switch and a second terminal of the eighth switch are coupled together and configured to obtain the completion signal from the first circuit,
    a third terminal of the seventh switch is coupled to a first terminal of the eighth switch and to a first input of the second comparator,
    a third terminal of the eighth switch is coupled to a first terminal of the third transistor,
    a second terminal of the third transistor is coupled to the current source,
    a third terminal of the third transistor is coupled to ground,
    an input of the inverter is coupled to the output of the first comparator,
    a second input of the second comparator is coupled to an output of the inverter, and
    an output of the second comparator is configured to provide the output signal,
    wherein a width of the third transistor is substantially half a width of the second transistor.

13. The apparatus recited in claim 1, wherein the first value and the second value are digital values, and wherein the first value comprises at least two bits, the at least two bits including a first bit and a second bit, wherein the first bit is a least-significant bit of the first value and the second bit is a next-least-significant bit of the first value, and wherein the second value includes a third bit, wherein the third bit is a least-significant bit of the second value, and wherein the first circuit comprises:
- a first capacitor having a first capacitance;
- a second capacitor having a second capacitance, the second capacitance being substantially half of the first capacitance;
- a first switch;
- a second switch;
- a first transistor; and
- a first comparator, wherein:
- the first switch is coupled to a first terminal of the first capacitor and is configured to be closed in response to the first bit being equal to 1 and the third bit being equal to 1 and open otherwise,
- a second terminal of the first capacitor is coupled to the first transistor and to the first comparator,
- the second switch is coupled to a first terminal of the second capacitor and is configured to be closed in response to the second bit being equal to 1 and the third bit being equal to 1 and open otherwise,
- a second terminal of the second capacitor is coupled to the first transistor and to the first comparator, and
- an output of the first comparator is configured to provide the completion signal to the second circuit.

14. The apparatus recited in claim 13, further comprising: a current source coupled to the first transistor.

15. The apparatus recited in claim 13, further comprising:
- a first logic gate; and
- a second logic gate, wherein:
- a first input of the first logic gate is configured to receive the third bit,
- a second input of the first logic gate is configured to receive the first bit,
- an output of the first logic gate is coupled to the first switch,
- a first input of the second logic gate is configured to receive the third bit,
- a second input of the second logic gate is configured to receive the second bit, and
- an output of the second logic gate is coupled to the second switch.

16. The apparatus recited in claim 13, wherein the first transistor has a first width, and wherein the second value includes a fourth bit, wherein the fourth bit is a next-least-significant bit of the second value, and wherein the second circuit comprises:
- a third capacitor having the first capacitance;
- a fourth capacitor having the second capacitance;
- a third switch;
- a fourth switch;
- a second transistor, wherein a width of the second transistor is substantially half a width of the first transistor; and
- a second comparator, wherein:
- the third switch is coupled to a first terminal of the third capacitor and is configured to be closed in response to the first bit being equal to 1 and the fourth bit being equal to 1 and open otherwise,
- a second terminal of the third capacitor is coupled to the second transistor and to the second comparator,
- the fourth switch is coupled to a first terminal of the fourth capacitor and is configured to be closed in response to the second bit being equal to 1 and the fourth bit being equal to 1 and open otherwise,
- a second terminal of the fourth capacitor is coupled to the second transistor and to the second comparator, and
- an output of the second comparator is configured to generate the output signal.

17. The apparatus recited in claim 16, further comprising:
- a third logic gate; and
- a fourth logic gate, wherein:
- a first input of the third logic gate is configured to receive the fourth bit,
- a second input of the third logic gate is configured to receive the first bit,
- an output of the third logic gate is coupled to the third switch,
- a first input of the fourth logic gate is configured to receive the fourth bit,
- a second input of the fourth logic gate is configured to receive the second bit, and
- an output of the fourth logic gate is coupled to the fourth switch.

18. The apparatus recited in claim 1, wherein:
- the first circuit is coupled to a first storage element, wherein the first storage element stores the first value or the second value, and
- the second circuit is coupled to a second storage element, wherein the second storage element stores the third value or the fourth value.

19. A method of performing a time-domain multiply-and-accumulate (MAC) operation using a first circuit and a second circuit, the method comprising:
- in response to a trigger signal provided to an input line of the first circuit, performing a first multiplication of a first value and a second value;
- the first circuit generating a completion signal indicating completion of the first multiplication;
- in response to the completion signal, the second circuit performing a second multiplication of a third value and a fourth value; and
- the second circuit generating an output signal via an output line indicating completion of the second multiplication,
- wherein an amount of elapsed time between the trigger signal and the generation of the output signal represents a sum of the first multiplication and the second multiplication.

20. A system for performing time-domain multiply-and-accumulate (MAC) computations, the system comprising:
- a plurality of circuits forming a chain, the plurality of circuits including at least a first circuit in the chain and a last circuit in the chain, wherein each of the plurality of circuits is configured to perform a respective multiplication operation by generating a respective indication of an amount of time representing a respective product of a respective input value and a respective weight, wherein, except for the respective multiplication operation of the last circuit in the chain, completion of each multiplication operation in the chain starting from the first circuit triggers the respective multiplication operation of a next circuit in the chain; and
- a time-to-digital converter (TDC) coupled to the plurality of circuits and configured to provide a digitized value of an elapsed time between a start of a first multiplication operation performed by the first circuit in the chain and the completion of a last multiplication operation performed by the last circuit in the chain, the digitized value representing a sum of the respective products generated by the plurality of circuits.

* * * * *